United States Patent
Pinski et al.

(10) Patent No.: US 11,861,421 B1
(45) Date of Patent: Jan. 2, 2024

(54) CONTROLLING TIMING OF EVENT DATA TRANSMISSIONS IN AN EVENT ARCHITECTURE

(71) Applicant: Amazon Technologies, Inc., Seattle, WA (US)

(72) Inventors: Nikita Pinski, Vancouver (CA); Mohamed Marzouk Adedoyin Mounirou, Vancouver (CA); Nicholas Smit, Vancouver (CA); Jakub Mateusz Narloch, Vancouver (CA); Kunal Chopra, Surrey (CA)

( * ) Notice: Subject to any disclaimer, the term of this patent is extended or adjusted under 35 U.S.C. 154(b) by 0 days.

(21) Appl. No.: 17/855,624

(22) Filed: Jun. 30, 2022

(51) Int. Cl.
 *G06F 9/44* (2018.01)
 *G06F 9/54* (2006.01)
 *G06F 9/30* (2018.01)

(52) U.S. Cl.
 CPC .......... *G06F 9/542* (2013.01); *G06F 9/30079* (2013.01); *G06F 9/544* (2013.01); *G06F 9/546* (2013.01)

(58) Field of Classification Search
 CPC ....................................... G06F 9/542
 USPC .......................................... 719/318
 See application file for complete search history.

(56) References Cited

U.S. PATENT DOCUMENTS

| | | | | |
|---|---|---|---|---|
| 2003/0149722 A1* | 8/2003 | Jolley | ................ | H04L 63/0884 707/E17.032 |
| 2008/0155559 A1* | 6/2008 | Fischer | ..................... | G06F 8/71 719/318 |
| 2021/0124786 A1* | 4/2021 | Bursik | ................ | G06F 16/9538 |

* cited by examiner

*Primary Examiner* — Timothy A Mudrick
(74) *Attorney, Agent, or Firm* — Lee & Hayes, P.C.

(57) ABSTRACT

Techniques for a service provider network to communicatively couple services and/or applications in a serverless computing environment. A pipe component can configure a pipe to integrate two services by transmitting data between services and/or applications using the pipe. The pipe may also be configured to transform how a service processes an event, control timing of event transmissions using the pipe, define an event structure for an event, and/or batch events. Pipes enable an application or service to exchange data with a variety of services provided by the service provider network while controlling what type of data is generated, stored, or transmitted.

20 Claims, 17 Drawing Sheets

1000

1002 — RECEIVE FIRST DATA INDICATING A FIRST EVENT SERVICE AS A SOURCE FOR SENDING EVENT DATA ASSOCIATED WITH AN EVENT, THE EVENT REPRESENTING A CHANGE IN A RESOURCE STATE, SECOND DATA INDICATING A SECOND EVENT SERVICE AS A TARGET FOR RECEIVING THE EVENT DATA ASSOCIATED WITH THE EVENT, AND THIRD DATA INDICATING A FILTER TO APPLY TO THE EVENT DATA

1004 — CONFIGURE A PIPE BETWEEN THE FIRST EVENT SERVICE AND THE SECOND EVENT SERVICE BASED ON THE FIRST DATA, THE SECOND DATA, AND THE THIRD DATA, THE PIPE REPRESENTING A VIRTUAL COMMUNICATION CHANNEL FOR SENDING THE EVENT DATA ASSOCIATED WITH THE EVENT

1006 — RECEIVE AN INDICATION OF THE EVENT AT THE FIRST EVENT SERVICE

1008 — DETERMINE, BY THE FILTER AND AS FILTERED EVENT DATA, A MODIFICATION TO THE EVENT DATA BASED ON THE INDICATION OF THE EVENT

1010 — SEND, BY THE FIRST EVENT SERVICE AND VIA THE PIPE, THE FILTERED EVENT DATA TO THE SECOND EVENT SERVICE BASED ON THE INDICATION OF THE EVENT

```
IDENTIFY MULTIPLE EVENTS AT A FIRST EVENT SERVICE FOR SENDING TO A SECOND EVENT SERVICE IN A
SERVERLESS COMPUTING ENVIRONMENT, AN EVENT OF THE MULTIPLE EVENTS REPRESENTING A CHANGE
IN A RESOURCE STATE
1302
```

```
DETERMINE, BASED ON IDENTIFYING THE MULTIPLE EVENTS, A CONFIGURATION VALUE OF A PIPE
REPRESENTING A VIRTUAL COMMUNICATION CHANNEL FOR TRANSFERRING EVENT DATA ASSOCIATED WITH
THE MULTIPLE EVENTS BETWEEN THE FIRST EVENT SERVICE AND THE SECOND EVENT SERVICE, THE PIPE
DISPOSED BETWEEN THE FIRST EVENT SERVICE AND THE SECOND EVENT SERVICE BASED AT LEAST IN PART
ON RECEIVING INPUT DATA AT A PREVIOUS TIME INDICATING A) THE FIRST EVENT SERVICE AS A SOURCE OF
THE MULTIPLE EVENTS B) THE SECOND EVENT SERVICE AS A TARGET OF THE MULTIPLE EVENTS, AND C) TO
PERFORM BATCHING AT ONE OR MORE OF: THE FIRST EVENT SERVICE OR THE SECOND EVENT SERVICE
1304
```

```
DETERMINE, BASED ON THE CONFIGURATION VALUE OF THE PIPE, ONE OR MORE BATCHING RULES FOR
BATCHING THE MULTIPLE EVENTS
1306
```

```
EXPOSE, BY THE PIPE, A BATCH APPLICATION PROGRAM INTERFACE (API)
1308
```

```
DETERMINE A BATCH SIZE FOR A PORTION OF THE MULTIPLE EVENTS BASED ON THE ONE OR MORE
BATCHING RULES AND THE BATCH API
1310
```

```
SEND, FROM THE FIRST EVENT SERVICE TO THE SECOND EVENT SERVICE, THE PORTION OF THE MULTIPLE
EVENTS OVER THE PIPE IN A BATCH BASED ON THE BATCH SIZE
1312
```

FIG. 13 ns of events) with one or more services and/or applications.

CONTROLLING TIMING OF EVENT DATA TRANSMISSIONS IN AN EVENT ARCHITECTURE

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet. These services are often managed, accessed, or otherwise interacted with using interfaces such as application programming interfaces (APIs). These APIs provide accessibility and usability to users of cloud-based services over the Internet.

Some services may be incompatible due to differences in code, interfaces, or protocols used for processing data. Due to the incompatibilities between some services, the computing device of the subscriber can experience various issues (e.g., latency and/or message failures) when a service attempts to process data from another service that uses a different API, data format, or the like. In some examples, the subscriber (e.g., a developer of an application or service) provides code to mitigate differences in processing capabilities between an application and a service (or multiple services). However, in other examples, it may not be possible for the subscriber to provide such code resulting in at least some services that are unable to send data to or receive data from another service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 10 illustrates a flow diagram of an example method performed by a service provider network for filtering data associated with an example pipe.

FIG. 13 illustrates a flow diagram of an example method performed by a service provider network for batching events for transmission using an example pipe.

DETAILED DESCRIPTION

Figure 1:
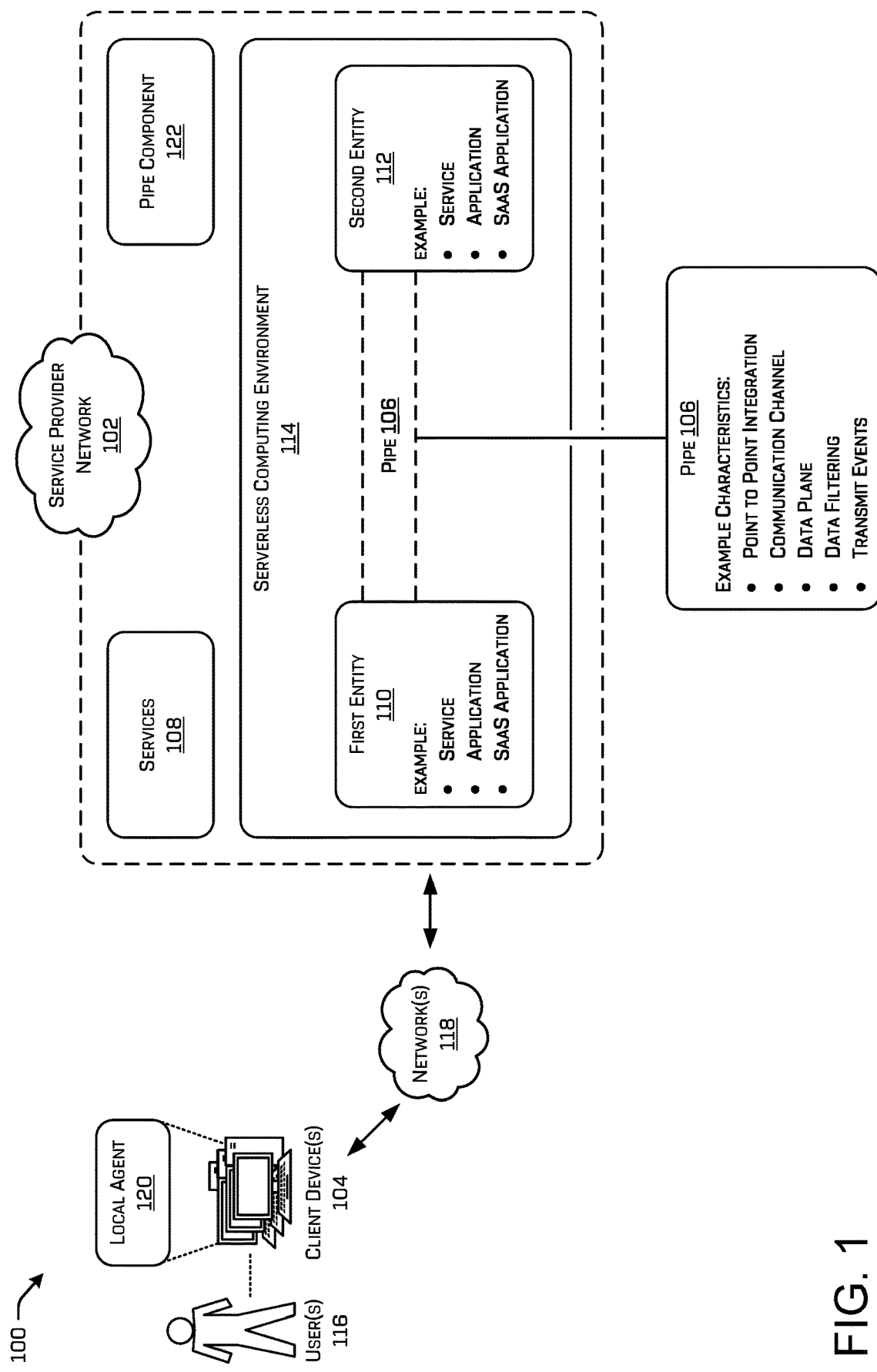
FIG. 1 illustrates a system-architecture diagram of an example environment in which a service provider network communicates with one or more client devices and configures a pipe to exchange data between services of the service provider network.

This disclosure relates to techniques for communicatively coupling services and/or applications in a serverless computing environment. For example, a computing device can configure a pipe to integrate two services in an event-driven architecture. The pipe can represent a virtual communication channel for transmitting data between services and/or applications. To configure a pipe, a developer can provide input via a user interface indicating a source of an event, a target of the event, and filter information describing how to modify the event for sending to the target. The pipe may also be configured to enrich or transform an event to modify how a service processes an event, control timing of event transmissions using the pipe, define an event structure for an event, and/or batch events. By configuring a pipe as described herein, services and applications can be communicatively coupled independent of (i.e., without) requiring a human to provide computer-readable instructions to integrate the services and applications. Pipe(s) enable an application associated with the developer to connect various services provided by the serverless computing environment while controlling what type of data is generated, stored, or transmitted.

An event-driven architecture can include services that send or receive an event which can be thought of as change in a resource state (e.g., change in a dataset). For example, the event can represent a notification (e.g., an item was placed in a shopping cart, an order was shipped, a new entry was added to a dataset, a new file was added to a directory, etc.) and/or a state (e.g., item information, price information, metadata, etc.). In various examples, a pipe can be configured to send, receive, or exchange events (or portions thereof) between an event source to an event destination. After configuring the pipe, events can be routed, filtered, transformed, batched, and/or buffered automatically and without receiving user provided code. In some examples, the pipe can facilitate the transmission of events that match a predetermined event structure. Using pipes to integrate or control event transmissions between services as described herein decouples the services thereby improving scaling and deployment of services over time.

Generally, a pipe can represent functionality of a control plane and a data plane for transmitting an event synchronously or asynchronously between two entities of a serverless computing environment. The pipe can be thought of as a virtual communication channel for exchanging event data associated with an event. One end of the pipe is a source of an event and the other end of the pipe is a destination (or target/consumer) for the event. In some examples, the source or the destination can include an application, a service, or another pipe. By way of example and not limitation, multiple pipes in the serverless computing environment can transmit event data from a single source to multiple different destination services, and different portions of the event data can be sent to the different destination services depending upon how each pipe is configured. For instance, an event can represent a notification that an order has shipped, and a first pipe can facilitate sharing the event with a first destination service (e.g., an order service) and a second pipe can facilitate sharing the event with a second destination service (e.g., an analytics service).

To configure a pipe, a user (e.g., a developer of an application or service) can provide input (e.g., via an API) to a computing device indicating an event source (e.g., a service, an application, or another pipe that is a source of an event) and an event destination (e.g., a service, an application, or another pipe that is a target of the event). The user can also specify a filter and/or a transformation to apply to the event such as a size of a payload or a type of data for transferring using the pipe. In this way, a subset of the event data associated with an event can be transmitted over the pipe. In some examples, the user can indicate a type of computing resource for processing event data by a source service or a target service of the pipe. For instance, the user may also or instead provide an input indicating that a service processes an event (or event data) using a specific API, kernel, compute service, or data format.

In some examples, configuring the pipe can include a user providing an input indicating whether to associate the pipe with a queue or buffer. The user can, for example, interact with one or more input controls of a user interface output for display on a display device to indicate whether to buffer events associated with the pipe. In some examples, a buffer component of the serverless computing environment can implement a buffer, such as a queue (e.g., a first-in first-out queue), between the event source and the event destination to capture, store, or archive event data. In some examples, the queue can store event data associated with events to selectively pause, resume, or replay processing of event data through the pipe without losing event data (e.g., the event, if not transmitted or "pushed" for a period of time may be deleted). Replaying event data from the buffer can enable a developer to test functionality of an application (e.g., identify and fix bugs in code). Implementing the buffer can further enable a developer to pause operation of an application (to perform maintenance for example) while still capturing events that would otherwise be lost. In some examples, responsive to receiving an indication to resume sending of events using the pipe (e.g., maintenance is complete and the application is back online) events stored in the buffer can begin from a time that the pipe was paused, or from a current time. Additional details for associating the pipe with a buffer or queue are discussed throughout this disclosure including in relation to FIG. 2.

In various examples, the integration techniques described herein can include defining an event structure (also referred to herein as a schema) for an event and using the event structure to generate, store, filter, batch, buffer, or transform events associated with various services or applications in the serverless computing environment. For example, the event structure can define types of data to include as an event or computational resources to apply to the event. In some examples, the event structure can represent a data format that includes fields for storing values that represent characteristics of the event (e.g., an event name, a time, a version, an account, a source, a destination, metadata, a pipe name, a batch size, a batch interval, and/or a data format, just to name a few). The event structure can also identify how to manage events that differ from the event structure (e.g., forward to the buffer, modify a compute resource, and so on). In some examples, the pipe can be configured to transmit events having a same event structure as the defined event structure and to refrain from transmitting events having a different event structure from the defined event structure over the pipe. In various examples, a can store data associated with each event structure including storing multiple versions of the event structure as the event structure is updated over time. By defining an event structure for an event, only relevant event data is exchanged between a source and a target of the pipe thereby improving the quality or usefulness of events and enabling more efficient use of resources (e.g., network bandwidth).

In some examples, defining the event structure can include receiving input from a computing device associated with a developer of an application or service. For instance, the developer can interact with one or more controls of a user interface to indicate a preference for archiving (or not archiving) events associated with an event source and/or an event destination of a pipe. In some examples, the developer can indicate a particular data format or API to generate, transmit, or otherwise process an event. The event structure can include fields that store values to indicate the input, or preferences, provided by the developer at a first time, and can be used by one or more components of the serverless computing environment to detect events representing a change in a field associated with the event structure. The event structure may also, or instead, indicate whether a version of the event structure is forward compatible with a future version or backward compatible with a previous version. In various examples, the event structure can represent a data file format (e.g., a JavaScript Object Notation (JSON) file, binary data, string data, etc.), a Java language, a data serialization language, a human-readable data serialization language, etc. Additional details for using an event structure in association with one or more pipes are discussed throughout this disclosure including in relation to FIG. 2.

In some examples, the serverless computing environment can implement a pipe component to configure a pipe with optional batching of events associated with an event source and/or an event destination. In some examples, a batching component can determine a batch size and/or a batch interval that maximizes throughput of events with a minimal number of transmission errors between the source and the destination of the pipe. For example, a machine learned model can receive historical batch size and batch interval data as well as previous transmission error data associated with a pipe as input, and determine an output indicating a batch size and/or a batch interval for efficient processing of events by both the source and the destination of the pipe. In other words, the machine learned model can determine batching characteristics with consideration to differences in a batch size or batch interval of the source and a batch size or batch interval of the destination. In various examples, batching can be responsive to verifying one or more batching rules associated with a pipe (stored as part of the event structure or otherwise associated with an event). In some examples, the pipe can expose a batch API to cause batching of events associated with the source or the destination in accordance with the batch size or the batch interval (output by the machine learned model or in association with one or more batching rules).

As described herein, a source or a destination of a pipe can comprise a variety of different services and/or applications. For example, the source or the destination can represent a Software as a Service (SaaS), a payment service, an order service, a fulfillment service, a forecasting service, a security service, a database service, or a compute service, just to name a few. In various examples, a pipe component can generate a pipe to communicatively couple a source and a destination having different event processing capabilities (e.g., the source and the destination are associated with different APIs, data formats, etc.). The pipe can, for instance, determine an API, a programming language, or other processing information usable for the destination to process the event data (e.g., send a message acknowledging receipt of the event from the source). In some examples, the pipe can invoke an API to cause an event in a first data format (e.g., JSON, XML, etc.) or language (e.g., Python, Java, C #, Go, Ruby, etc.) to transform to a second data format or language. In such examples, the transformation associated with the pipe can be performed independent of a developer providing computer-readable instructions to the source (e.g., without the developer writing code that enables communication between the source and the destination). Using pipes to communicate events among services enables a developer to provide input on what functionality to include in a pipe without being required to send computer-readable instructions (e.g., integration code) to the source or the destination.

An event-driven architecture can represent a cloud platform that provides or hosts various types of services (also referred to as backend service). For instance, backend services may include business-application services, financial-institution services, healthcare services, and so forth. Client devices often interact or access these backend services over a network, such as the Internet, using API calls that define an operation or interaction that the client device is requesting be performed. For example, an application or agent may be running locally on a client device, and upon receiving input indicating an interaction to be performed with the backend service, the local agent may send a REST API call over the Internet to an API gateway of the service provider network that is hosting the backend service. The API gateway generally routes the API call to business logic that invokes the API call and performs the requested operation on the backend service.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 communicates with one or more client devices 104 and configures a pipe 106 to exchange data between services 108 of the service provider network 102. For example, the pipe 106 can communicatively connect a first entity 110 and a second entity 112 in a serverless computing environment 114. In some examples, a user 116 of the client device(s) 104 can interact with the service 108 of the service provider network 102 and/or provide input indicating desirable functionality for consideration when configuring the pipe 106.

In some examples, the service provider network 102 may comprise clusters of managed servers stored in data centers located across geographic areas. The service provider network 102 may be a distributed network through which users (often customers) may interact via the client device 104 to manage or otherwise interact with services 108 provided by the service provider network 102. The service provider network 102 may be managed by a service provider, and may provide various types of services 108, such as an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may represent a managed message queuing service that enables users to send, store, and receive messages between software components at any volume without losing messages or requiring that other services 108 be available.

The services 108 described above, and any other services, may be provided in one particular implementation by one or more data centers operated by the service provider. As known to those skilled in the art, data centers are facilities utilized to house and operate computing resources, such as computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or de-scaling the computing resources based upon demand for the resources and/or other factors.

In some examples, a user(s) 116 may interact with services 108 using the client device(s) 104. Generally, the client device(s) 104 may be any type of computing device capable of connecting to the service provider network 102 via a suitable data communications network 118 such as, but not limited to, a laptop or desktop computer, a tablet computing device, a server computer, or a mobile telephone. Administrative users employed by the operator of the service provider network 102, such as administrators managing the operation of the service provider network 102, might also connect with, manage, and utilize resources provided by the service provider network 102 in a similar fashion.

According to the techniques described herein, users 116 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

Generally, the user(s) 116 may interact with the client device(s) 104 to receive or employ a service 108. The users 116 may be one or more of individual users, groups of users, organizations, businesses, or other entities that interact with the service provider network 102 via respective client devices 104. The client devices 104 may be any type of computing device capable of connecting to the service provider network 102 via a suitable data communications network 118 such as, but not limited to, a laptop or desktop computer, a tablet computing device, a server computer, or a mobile telephone. Additionally, the client devices 104 may have various components, algorithms, software, client applications, and so forth, to perform authentication methods with identity service providers. For instance, the client devices 104 may have a software client for communicating using various network protocols, including cryptographic network protocols, such as FTPS protocol STP protocol, Web Authentication (WebAuthn) protocol, Universal $2^{nd}$ Factor (U2F) protocol, Universal Authentication Framework (UAF) protocol, and/or any other authentication protocol.

To utilize the services 108 or to otherwise provide input to the service provider network 102, a user 116 may access a local agent 120 running on the client device 104, where the local agent 120 can represent software that is associated with the services 108. The local agent 120 may also, or instead, represent a user interface having one or more controls (or input controls) for the user 116 to provide input usable by a pipe component 122 to generate, update, or otherwise manage the pipe 106. For instance, the user 116 can be a developer that provides input to one or more controls of the local agent 120 to indicate a source of an event, a target of an event, and whether to filter, modify, archive, buffer, and/or batch an event(s) at the source or the target. In some examples, the pipe component 122 can generate or configure the pipe 106 based at least in part on receiving data from the client device 104 indicating preferences of the developer.

In some examples, the serverless computing environment 114 can represent an event-driven architecture and the pipe 106 can represent a point to point integration of an event source and an event destination (or target). The pipe 106 can serve as a virtual communication channel, a control plane, and/or a data plane between the first entity 110 (e.g., a first service, first application, or first Software as a Service (SaaS) application) and the second entity 112 (e.g., a second service, second application, or second Software as a Service (SaaS) application). The first entity 110 can send an event to the second entity 112, and the pipe 106 can apply one or more rules to filter, batch, queue, archive, or otherwise modify the event. In some embodiments, the pipe 106 need not include a filter and may instead facilitate passing, transmitting, copying, etc., the event (or data associated with the event) from the first entity 110 to the second entity 112. In this embodiment, the event/data may not be modified when being passed through (or via) the pipe 106.

In some examples, the first entity 110 can be configured to send an event to the pipe 106, and the pipe 106 can be configured to transmit the event to the second entity 112 without the first entity 110 having explicit knowledge of the second entity 112 (e.g., not storing an address or information associated with the destination). The pipe 106 can, for example, cause the event to be sent from the first entity 110 to the second entity 112 based on the pipe 106 being configured with the destination to automatically transfer the event. In some examples, the first entity 110 and/or the second entity 112 can push an event using the pipe 106 without the first entity 110 and/or the second entity 112 knowing an event source or an event destination. In some examples, the pipe 106 can pull an event from the first entity 110 (e.g., the source) based at least in part on an API exposed by the first entity 110. For example, the pipe 106 can pull data from the first entity 110 without the first entity 110 being "aware of" the pipe 106 (e.g., without the first entity 110 receiving data indicating a pipe name for sending data). Thus, events can be pushed to and/or pulled from an entity based on how the pipe is configured and independent of a first end of the pipe 106 being explicitly aware of the pipe and/or the second end of the pipe (e.g., the entity may not store source and/or destination information to route the event but instead be instructed to send the event to the pipe).

In various examples, the first entity 110 and/or the second entity 112 can be a third-party entity (e.g., a third-party service, a third-party application, a third-party SaaS, etc.). The pipe 106 can, in some examples, include a third-party entity as a source and/or a destination. Further, the pipe 106 can be associated with a third-party entity between the source and the destination in some examples (e.g., data can be exchanged between the source or the destination and another service or application invoked by an API associated with the event).

In some examples, the client device 104 may send an API call over the network(s) 118 to an API gateway of the service provider network 102. The API gateway may send the API call to the pipe component 122 for invocation to interact with the pipe 106.

In some instances, the pipe component 122 may access a database (not shown) that stores an event structure for the pipe 106. For instance, the pipe component 122 may query the database to identify an event structure usable for generating or transmitting events in the pipe 106. Generally, the database may store event structures for events associated with multiple pipes. Additional details for associating the pipe with an event structure can be found throughout this disclosure.

By way of example and not limitation, a developer can determine an application architecture for providing an application over the Internet using various services available from a service provider network. The developer can be responsible for designing the application architecture, maintaining operation of the application, and directing how services (e.g., microservices in a serverless computing environment) communicate with one another. Because services and applications can be associated with different data formats, not all services and applications can communicate without the developer writing code, or computer-readable instructions to integrate or enable data transmissions among services. In particular, the developer can configure the application to make use of various services provided by the service provider network. Using the techniques described herein, the developer can provide input to a user interface to convey what type of data is generated, stored, or transmitted between the services. For example, one or more pipe(s) enable services or applications to exchange data that would otherwise require the developer to write code.

In examples when the developer manages an application selling a product, the pipe can be configured to capture information related to the sale of the product as events (e.g., a sale price, a customer name, a shipping address, etc.). The developer can organize how events are transferred among the services by providing information suitable for the pipe component 122 to determine a pipe data plane for transmitting events with consideration to how each service can store, batch, buffer, filter, and/or process the event. The developer can, for example, specify implementing a data streaming service along with a batching service and an order fulfilment service and a pipe can be configured between two services to ensure that each respective service sends or receives changes to certain types of data.

Figure 2:
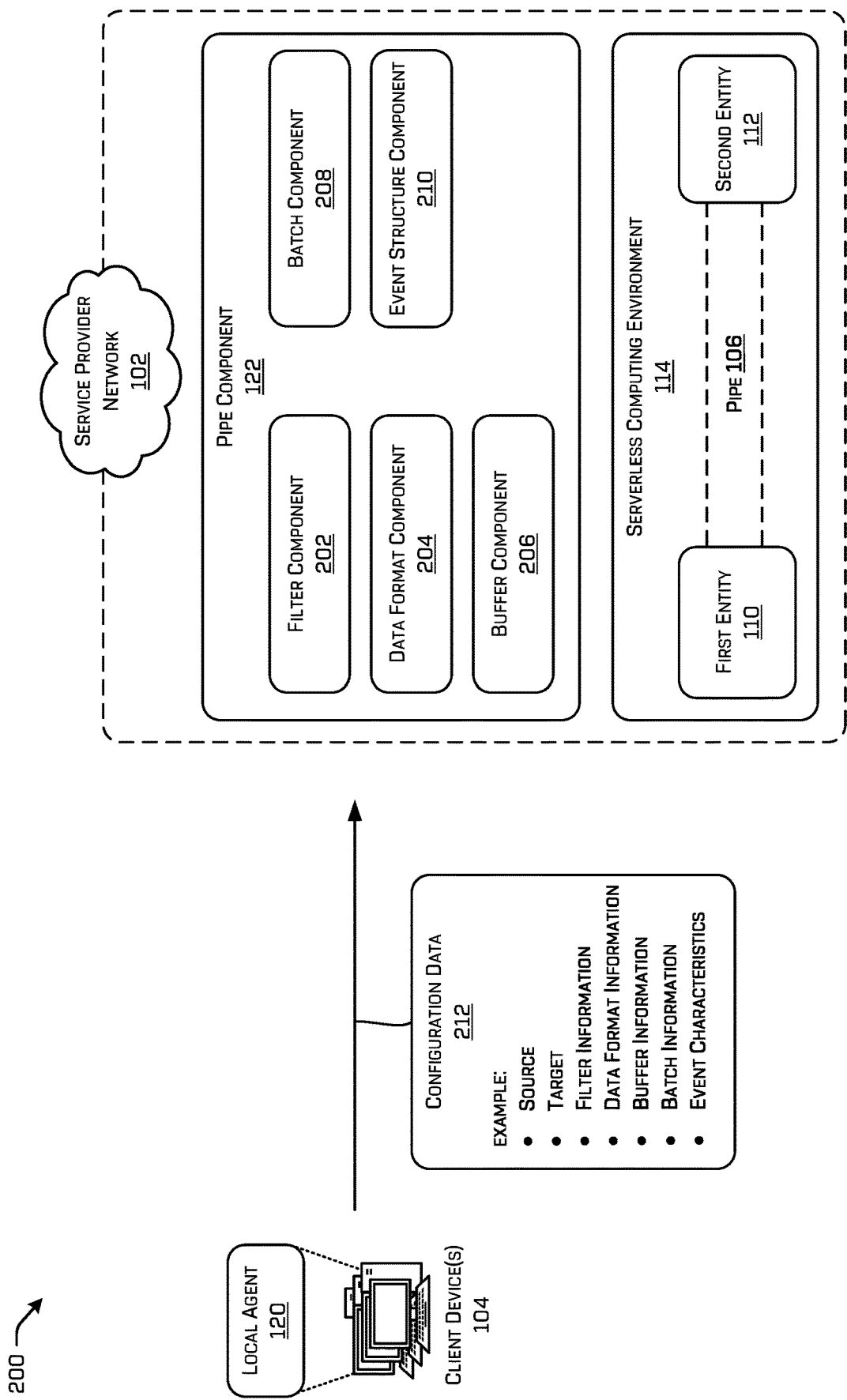
FIG. 2 illustrates a diagram of an example service provider network implementing an example pipe component to configure a pipe.

FIG. 2 illustrates a diagram 200 of an example service provider network implementing an example pipe component to configure a pipe. For example, the service provider network 102 can implement the pipe component 122 to configure the pipe 106. As shown in FIG. 2, the pipe component 122 comprises a filter component 202, a data format component 204, a buffer component 206, a batch component 208, and an event structure component 210. Though depicted in FIG. 2 as separate components of the pipe component 122, the functionality associated with the filter component 202, the data format component 204, the buffer component 206, the batch component 208, and/or the event structure component 210 can be included in a different component of the service provider network 102 or the pipe 106. In some instances, the components described herein may comprise a pluggable component, such as a virtual machine, a container, a serverless function, etc., that is capable of being implemented in any service provider network 102 and/or in conjunction with any API gateway.

Generally, the pipe component 122 can employ one or more of: the filter component 202, the data format component 204, the buffer component 206, the batch component 208, and the event structure component 210 to generate and/or update features of the pipe 106. For instance, the pipe component 122 can initially configure a pipe or make updates to the pipe configuration using one or more of the aforementioned components. In various examples, the pipe component 122 can cause functionality associated with one or more of the filter component 202, the data format component 204, the buffer component 206, the batch component 208, and the event structure component 210 to be performed at the first entity 110, the second entity 112, or another service (e.g., a compute service, streaming service, and so on) between the first entity 110 (e.g., the source) and the second entity 112 (e.g., the destination). In some examples, the source and/or the destination of a pipe can include another pipe. Thus, the pipe 106 can act as a virtual communication channel for exchanging event data (or filtered portions thereof) between the source and the destination, as well as with other services invoked as part of the event (extensions of the pipe to other services to facilitate performing one or more of: filtering, modifying a data format, batching, buffering, archiving, or defining an event structure of an event).

In various examples, the pipe component 122 can receive configuration data 212 from the client device(s) 104 usable to configure the pipe 106. Configuring the pipe 106 can include, for instance, generating a new pipe or updating a previously generated pipe. The pipe 106 can include characteristics based at least in part on information associated with the configuration data 212 (e.g., information associated with a filter, a data format, a buffer, a batch, and so on). In some examples, the user 116 can interact with the local agent 120 to indicate a source and a destination (target) of an event in the serverless computing environment 114. The client device(s) 104 can determine the configuration data 212 based at least in part on input from the user 116 identifying the source of the event for sending via the pipe 106 and a destination for receiving the event, and optionally, one or more of: filter information, data format information, buffer information, batch information, and event characteristics. In various examples, the first entity 110 of FIG. 1 can represent an event source and the second entity 112 can represent an event destination.

In some examples, the configuration data 212 can include a key for encrypting events and/or a resource name or API of an encryption service usable to encrypt the events. A customer managed key can be provided by the user 116, for example, as part of the configuration data to associate or otherwise cause a preferred encryption for events using the pipe 106.

In various examples, the pipe component 122 can define the pipe 106 to include one or more characteristics. For example, based at least in part on the configuration data 212, the pipe component 122 can define the pipe 106 to include values that represent one or more of: a pipe name, a pipe description, a pipe state (e.g., initialized, created, updated, etc.), a source name, source characteristics, a destination name, destination characteristics, a role identifier, role parameters, one or more tags, filter information, transformation information, buffering information, batching information, and so on. The source characteristics or the destination characteristics can represent parameters associated with a preferred batch size, a maximum batch size, a data format, a buffer preference, or some other parameter. The filter information, the transformation information, the buffering information, and the batching information can identify a type of filtering, transforming, etc. to perform in relation to the pipe (if configured to perform such functionality). The role identifier can, for example, represent permissions associated with the pipe such as credentials usable by the pipe to access data from a source, a destination, and/or an intermediary service (e.g., a transformation service, a compute service, a filter service, etc.). The role parameters can represent a credential, a security key, or other data usable to determine a level of permission for exchanging data over the pipe (e.g., across different entities of the pipe). Tags, or a tag list, can represent a text string that defines a label, a caption, or other information. Generally, defining the pipe 106 can include associating the one or more characteristics in a data structure that can be updated to change the definition of the pipe over time. Merely for illustrative purposes, the request to create a new pipe and the associated configuration information could be formatted in accordance with the following:

```
CreatePipeRequest {
    Name: PipeName,
    Description: PipeDescription,
    InitialState: PipeInitialState,
    SourceID: SourceName,
    SouceParameters: PipeSourceParameters,
    EnrichmentID: EnrichmentCorponentName,
```

EnrichmentParameters: PipeEnrichmentParameters,
DestinationID: DestinationName,
DestinationParameters: PipeDestinationParameters,
RoleID: RoleName,
Tags: TagList,
}

In some examples, an entity (e.g., a service, an application, a SaaS, etc.) that is included in the service provider network 102 can be associated with an identifier that uniquely identifies the entity. For example, the first entity 110, the second entity 112, and the pipe 106 (e.g., the source name, the destination name, the pipe name, etc.) may comprise different identifiers to be uniquely identified in the service provider network 102. Different identifiers can include different formats and some formats can include entity specific information. A data format of an identifier can have, for example, different portions to represent information such as one or more of: a partition (e.g., a location of the entity), a service (e.g., a service nameplate), a region (e.g., a region code), an account id (e.g., an identifier of an account associated with the service provider network), a resource id (e.g., a name or path of an entity), and so on. In one example, the identifier can include a format "entity name: first portion: second portion: third portion," though another number of portions can also be used. By assigning the various identifiers, the pipe 106 can compose and/or exchange data in predefined chunks associated with a customer account.

Generally, the filter component 202 can represent functionality to apply a filter to event data associated with an event to determine filtered event data. The filter component 202 can determine the filtered event data based at least in part on one or more filters that refrain from sending an amount of data associated with the event over the pipe. For instance, the configuration data 212 can include one or more filters to apply to the event such as a payload filter that causes the event data to adhere to a specific payload size for transferring using the pipe. An event can include a variety of data as specified in an event structure determined by the event structure component 210. The event structure can include different fields to define an event, and the filter component 202 can apply a filter to trim, determine, or otherwise select portions of the event data to include or exclude when transmitting the filtered event data. In this way, less than all the data associated with an event can be sent to the event destination via the pipe 106 thereby saving computational resources and/or network resources to send the filtered event data (relative to not filtering the event data).

The data format component 204 can represent functionality to determine a data format (e.g., a programming language, an API, a kernel, and the like) usable by the event source or the event destination to process, send, or receive an event. For instance, the data format component 204 can, for example, determine the data format for the event based at least in part on the configuration data 212 indicating a compute service or program interface to process event data at the event destination. In various examples, the user 116 can indicate for the pipe 106 to send the event to a compute service which can transform the event from a first data format to a second data format determined by the compute service. By implementing the data format component 204, the pipe 106 can be configured to cause an event generated at the source to transform from an initial data format to another data format usable by the event destination (e.g., to reduce an amount of data associated with the event).

In some examples, the data format component 204 can receive an indication to transform the event data from a first data format to a second data format (e.g., an event source can generate an event for a pipe using a type of data format that is different from a type of data format available to the event destination). The indication to transform the event data can, for example, be received from a computing device such as the client device 104 or from a component of the service provider network 102 (e.g., the pipe component 122 or a component thereof). In various examples, a user (e.g., a developer or administrator) can provide data format information as part of the configuration data 212 that indicates a compute service or program interface (e.g., an API, a programming language, a kernel, or other computing resource) for the event destination to process the event (e.g., acknowledge receipt of the event sent from the source). Thus, the configuration data 212 can cause the data format component 204 to identify, detect, or otherwise determine a data format usable by the event source or the event destination to transmit (e.g., send or receive) event data associated with an event.

The data format component 204 can, in some examples, determine a data format usable with the pipe 106 (e.g., a data format usable by the first entity 110 or the second entity 112) based on identifying that the source and the destination operate using different types of data formats. For example, the data format component 204 can determine a difference between a first API associated with the event source and a second API associated with the event destination, and determine a representational state transfer (REST) API for the event destination to process the event data associated with the event.

In some examples, the data format component 204 can determine that a first data format associated with event data or an event source is incompatible with a second data format associated with the event destination. In such examples, the data format component 204 can modify, transform, or convert at least a portion of the event data from the first data format to the second data format. For instance, the data format component 204 can identify the second data format based at least in part on the configuration data 212 or by using a function to access conversion data from a database or component that maps services to usable data formats (e.g., the database 312 of FIG. 3).

The data format component 204 can also, or instead, be implemented to apply a template language to the event to modify event data associated with an event. For example, the data format component 204 can use one or more different types of templating languages to change a format of the event data to a desired template format. In various examples, the template language can be determined based at least in part on the configuration data 212 received from the client device(s) 104. In some examples, the user 116 can determine a customer template for formatting an event, and provide an indication to use the custom template for events transmitted using the pipe. For example, the user 116 can cause the pipe component 122 to configure the pipe 106 to include templating functionality based at least in part on selecting a source, a destination, and a template language or template service. In some examples, the template service can include a resource name, and the pipe can use the resource name to route an event from an event source to the template service. By using templating languages, specific event data can be transformed and sent to the event destination using the pipe.

Generally, the buffer component 206 represents functionality to store event data associated with the first entity 110 and/or the second entity 112. For example, the pipe 106 can be associated with or otherwise include a buffer to capture events that the first entity 110 is unable to send to the second entity 112 due to a time period elapsing, multiple unsuccessful attempts to send the event, an incompatibility between the source and the destination (e.g., different processor interfaces, etc.), or some other reason. In some examples, the buffer can represent a first-in first-out queue such as a dead letter queue.

In various examples, the buffer component 206 can store events for a time period until the events can be transmitted to the event destination. For example, the buffer component 206 can store events due to an error in a communication between the first entity 110 and the second entity 112, an operational error of the first entity 110 or the second entity 112, or a request from a user (e.g., the user 116 pauses an application or service to perform maintenance, etc.). The buffer component 206 can be configured to transmit the events to the event destination in various ways. For example, the events can be transmitted responsive to the event destination being able to receive data (e.g., the event destination sent a response to the buffer component 206 to send the event data), responsive to operation being restored to the first entity 110 or the second entity 112, or responsive to another request from the user (e.g., the user resumes functionality of the service or application). Storing event data or sending stored event data to the event destination may also, or instead, be based at least in part on receiving an input via a control of a user interface to pause event transmissions associated with the pipe 106 and/or receiving an input to resume event transmissions based at least in part on receiving another input via the control of the user interface. Further, resuming sending of stored event data can begin from a current time or from a previous time at which the storage began. Thus, the buffer component 206 can be implemented to pause, resume, or replay events thereby providing a subscriber of the service provider network 102 flexibility to check events for errors in code or other issues affecting performance of the service from which the event generated.

In some examples, the buffer component 206 can determine that the first entity 110 and/or the second entity 112 is unable to send and/or receive event data associated with an event and store event data associated with the event based at least in part on the determination. For instance, the buffer component 206 can store the event based at least in part on determining that a first queue associated with the first entity 110 is full or rejected the event data, a second queue associated with the second entity 112 is full or rejected the event data, and/or the first entity 110 and/or the second entity 112 is not associated with the queue.

In some examples, the buffer component 206 can determine that a time period for sending event data from a source to a destination has expired without the event data being sent, and automatically store the event data in the buffer based at least in part on determining that the time period for sending the event data expired. In some examples, the user 116 can provide a retention period for storing the event data as well as whether to archive events before and/or after a particular service or application (e.g., before delivery to a compute service, after the compute service but before delivery to the destination, etc.). The user 116 can also indicate for inclusion in the configuration data 212, a maximum event age (without being sent) or a maximum number of delivery attempts and buffering of the event data can be based at least in part on the maximum event age and/or the maximum number of delivery attempts indicated Accordingly, event data can be archived and available for accessing at a later time.

In some examples, the buffer component 206 represents a buffer service that is associated with the pipe 106 based at least in part on input from the user 116 indicating to include this functionality for the pipe 106. In other words, if a user provides an input indicating that a buffer be added to a pipe, then configuring the pipe 106 includes associating a pipe name of the pipe 106 with an indication to perform buffering, archiving, etc. such as in the event structure that defines the event which is further described in relation to the event structure component 210 and elsewhere.

To configure a buffer for the pipe 106, the buffer component 206 can generate a communication channel between the buffer and the first entity 110 (e.g., a first event service) for exchanging the event data. In such examples, the communication channel can represent a path for transmitting the event data between the first entity 110 and the buffer. For instance, the communication channel can enable storage of the event data in the buffer, and in some instances, enable the first entity 110 to receive the event data from the buffer for sending to the second entity 112. However, the buffer component 206 can also generate an additional communication channel between the buffer and the second entity 112 (e.g., a second event service) for exchanging the event data. In this way, a first communication channel can direct the event data to the buffer from the first entity 110 and the second communication channel can direct the event data from the buffer to the second entity 112.

In various examples, the buffer component 206 can maintain a copy of the event data in the buffer for a time period after sending the event data from the buffer to the second entity 112. For example, in addition to ensuring that event data is not lost due to not being able to send or receive the event data, the pipe 106 can be configured to implement a buffer or other database or storage device to store the event data after the second entity 112 receives the event data. Thus, the client device(s) 104 and/or the user 116 can evaluate the event data to improve how a service or application operates (e.g., fewer data errors, faster upload or download speeds, etc.)

The batch component 208 can perform functionality to batch events for sending using the pipe 106. For example, the batch component 208 can cause the first entity 110 to batch events based at least in part on the configuration data 212 including batch information such as a batch size (e.g., a number of events in a batch), a batch interval, an invocation payload size, or other batch characteristic. In some examples, the first entity 110 and/or the second entity 112 can batch events based at least in part on an event structure received from the event structure component 210. The event structure can include information (e.g., batch rules) describing how and when a particular entity (source, destination) is to batch an event. Accordingly, the pipe 106 can perform batching for the event source and/or the event destination independently to account for differences in batch processing capabilities between different entities.

In some examples, the batch component 208 can determine a batch size and/or a batch interval that maximizes throughput of events in the pipe 106 with a minimal number of transmission errors between the first entity 110 and the second entity 112. The batch component 208 can, in some examples, implement a machine learned model to receive, as input, historical data describing a batch size, a batch interval, and transmission error data associated with the pipe. The machine learned model can determine an output indicating a batch size, a batch interval, or other batch rule for efficient processing of events by both the first entity 110 and the second entity 112 of the pipe 106. Generally, the machine learned model can determine batching rules for a particular entity with consideration to differences in a batch size and/or a batch interval between the first entity 110 and/or the second entity 112.

In various examples, the batch component 208 can determine one or more batching rules for applying to events for transmitting using the pipe 106. In some examples, the pipe 106 can expose a batch API to cause batching of events associated with the first entity 110 and/or the second entity 112 based at least in part on the one or more batch rules. For example, the batch API can cause the first entity 110 and/or the second entity 112 to batch in accordance with the one or more batch rules derived from the configuration data 212 and/or output data from the machine learned model. In some examples, the one or more batch rules comprise a first maximum payload of the first entity 110, a second maximum payload of the second entity 112, a first maximum batch size of the first entity 110, or a second maximum batch size of the second entity 112. In one nonlimiting example, exposing the batch API comprises the pipe 106 exposing a Fork-join algorithm to batch two or more events, though other batching techniques can be used. By way of example and not limitation, the pipe 106 can support batching the events with approximately 10,000 per API call or 2 MiB of data, though other sizes are also contemplated depending upon the capabilities of an entity to process a received batch.

The batch component 208 can, in some examples, send a batch associated with a first batch size from the first entity 110 to the second entity 112, and receive a runtime error (or other error) indicating that the second entity 112 is unable to receive the first batch associated with the first batch size. Based at least in part on the runtime error, the batch component 208 can determine a second batch size that is smaller than the first batch size and send a second batch from the first entity 110 to the second entity 112 based on the second batch size. For example, the batch component 208 can automatically bisect batches responsive to determining the runtime error, and send the bisected batches to the second entity 112 using the pipe 106. In various examples, the batch component 208 can determine the second batch size based at least in part on a batch size associated with the second entity 112 and/or a batch size associated with a service performing a transformation to the event data. For instance, the second batch size can represent a minimum, an average, or a maximum batch size for a transformation service to transform events associated with the batch. In some examples, the batch component 208 can determine a response to the runtime error based at least in part on batch information associated with another entity or service (e.g., the second entity 112 or the transformation service can direct the response to the runtime error by the batch component 208).

In various examples, a user (e.g., the user 116) may indicate for a pipe to be configured with batching by providing an input to a user interface associated with the client device(s) 104. Thus, performing batching in association with the pipe 106 can be based at least in part on receiving the input from a control of the user interface to enable batching multiple events at the first entity 110 or the second entity 112. In one or more examples, the batch component 208 can perform various batching techniques based on the input from the control of the user interface including but not limited to causing the pipe to expose the batch API to the multiple events.

In some examples, batching implemented by the batch component 208 can include in-memory batching (e.g., writing the event data to one or more memories) or file-system batching (e.g., storing the event data in a file system). For instance, the batch component 208 can determine whether to perform in-memory batching, file-system batching, or some other batching technique, depending on the complexity, latency, or scaling associated with the events.

In some examples, the pipe component 122 can determine a configuration value to indicate whether or not the pipe 106 includes batching functionality (or other functionality associated with another component). For example, input from the user 116 can determine whether or not a service or application associated with the client device(s) 104 batches events using the batch component 208, and the configuration value can indicate to the batching component 208 that the pipe 106 is, or is not, configured to include batching. For example, a configuration value can be associated with each pipe to enable other components of the pipe component 122 to determine attributes of the pipe 106. In some examples, the configuration value can be stored in the event structure output by the event structure component 210. Responsive to determining that the configuration value indicates the pipe 106 includes batching, the batching component 208 can access or determine one or more rules for batching events and use the batch rule(s) in association with the batch API to perform batching.

In some examples, the batch component 208 can determine a batch based at least in part on functionality to be performed on the batch by a downstream service. For instance, a first event service can represent a source of the multiple events and a second event service can represent a destination of the multiple events and a third event service can represent an intermediary service that provides functionality in association with the pipe 106 and before the destination receives the batch. For instance, the pipe component 122 can determine a third event service for receiving the batch based at least in part on another configuration value or another rule associated with another component (e.g., the filter component 202, the data format component 204, the buffer component 206, and/or the event structure component 210). For instance, the batch can be sent from the first event service to the third event service using the pipe, modified by the third service, and sent as a modified batch from the third event service to another intermediary service or to the second event service (e.g., the destination). In some examples, the batch is modified based on which components are implemented in association with the pipe 106.

Generally, the event structure component 210 represents functionality to define an event structure (also referred to herein as schema) for an event and using the event structure to generate, store, filter, batch, or modify events at various services or applications in the serverless computing environment 114. For example, the event structure can define types of data to include as an event and/or computational resources, a filter, batching, and/or buffering to apply to or perform relative to the event. In some examples, the event structure can represent a data format that includes fields for storing values that represent characteristics of the event (e.g., an event name, a time, a version, an account, a source, a destination, metadata, a pipe name, a batch size, a batch interval, and/or a data format, just to name a few). The event structure can also identify how to manage events that differ from the event structure (e.g., forward to the buffer, modify a compute resource, and so on). In some examples, the pipe 106 can be configured to transmit events having a same event structure as the defined event structure and to refrain from transmitting events over the pipe 106 having a different event structure from the defined event structure.

In various examples, the event structure component 210 can include or access a database, a container registry, a memory, or other storage device to store an event structure to define each event. Some events can include multiple versions as a user changes the desired structure of the event over time, and each of the multiple versions of the event structure can be saved in the database. By defining an event structure for an event as described herein, only relevant event data is exchanged between a source and a target of the pipe, and various components of the pipe component 122 can access the event structure from the database to identify a type of filtering, buffering, batching, and so on to perform for events that use the pipe 106.

In some examples, defining the event structure can include receiving input from a computing device associated with a developer of an application or service (e.g., the client device(s) 104). For instance, the developer can interact with one or more controls of a user interface to indicate a preference for whether or not to archive, buffer, batch, or modify events associated with the first entity 110 and/or the second entity 112 of the pipe 106. In some examples, the developer can indicate a particular data format or API to generate, transmit, or otherwise process an event. The event structure can include fields that store values to indicate the input, or preferences, provided by the developer prior to detecting one or more events. The event structure may also, or instead, indicate whether a version of the event structure is forward compatible with a future version or backward compatible with a previous version. In various examples, the event structure can represent a data file format (e.g., a JavaScript Object Notation (JSON) file, binary data, string data, etc.), a Java language, a data serialization language, a human-readable data serialization language, etc.

As mentioned, the event structure can represent a schema defining characteristics of the event and can identify a schema name, a schema format, schema compatibility (e.g., control how schemas can or cannot evolve over time by designating a compatibility field as: none, disabled, backward, backward all, forward, forward all, full, full all), a status, a create time, an update time, etc. In some examples, the event structure can identify a schema version such as a version number, a schema format, a version create time, and so on. In some examples, the schema, or event structure, can define metadata to include in the event such as a security key, information about the event (e.g., a product, a price, a customer, a customer address, and so on).

In some examples, the event structure can indicate a validation configuration comprising information to validate event data associated with an event. For example, the event structure component 210 can determine that the event data matches the event structure and output a first indication to send the event data to the event destination or determine that the event data does not match the event structure and output a second indication to refrain from sending the event data to the event destination. Thus, the validation configuration can be used to determine whether to transmit the event data or refrain from transmitting the event data using the pipe.

The event structure can, for example, indicate authentication information and/or security information to validate, verify, or authenticate an event source as a source of an event and the event destination as a destination of the event. For example, an API can verify user credentials, use a key or other authentication technique to validate an identity of the event source and the event destination. The authentication information and/or security information can represent a field in the event structure that identifies a security protocol, a security key, or other details for performing authorization and security (e.g., establishing and maintaining secure transmissions with authorized users and services).

In some examples, the event structure component 210 can update the event structure based at least in part on receiving an input to modify at least one of the fields of the event structure. For example, the client device(s) 104 can send a request to update how an event is defined based on input from a user via the local agent 120. As a result, the event structure component 210 can generate a new association between the pipe and the updated event structure in the container registry (e.g., map the pipe to the updated event structure). In this way, an event received after the update can transmit in the pipe based at least in part on the new association.

Different event structures can be associated with different pipes to transmit events. For example, upon detecting an occurrence of an event at a first entity, a first event structure can be used to send first event data to a second entity using a first pipe and a second event structure can be used to send second event data to a third entity using a second pipe. The first event data and/or the second event data can represent different modifications (e.g., filtering, buffering, batching, etc.) to the event based at least in part on the respective event structure. In various examples, sending the first event data from the first entity to the second entity using the first pipe and sending the second event data from the first entity to the third entity using the second pipe is performed substantially in parallel.

As discussed, the event structures (or schemas) are associated with a file format and can therefore be stored in a database or other storage device with the file format. For instance, the file format of the event structure can comprise JavaScript Object Notation (JSON), Protocol Buffers, a Java language, a data serialization language, a human-readable data serialization language, or the like. In some examples, the event structure component 210 can store conversion data usable to convert between different data formats (e.g., between Protocol Buffers and JSON). The conversion data can be used by the event structure component 210 to identify and store event structures in different data formats which are then made available to connect more services having different native or default data formats. Thus, different data formats can be determined dynamically based at least in part on the conversion data (e.g., as events are sent using the pipe).

In some examples, the event structure can include a field to represent a response to determining that the event data and the event structure have a different number of fields or a different order of field types. For example, the pipe component 122 can determine that an event has an additional or missing field from a number of fields in the event structure and/or determine that the fields match but an order of the fields in the event is different from an order of the fields in the event structure (e.g., compare the respective data to determine a field that does not match the default or expected event structure). Based on determining that the event data and the event structure have a different number and/or order of fields, the event structure component 210 can cause the appropriate response to further process or not process the event. For example, the response can indicate to send the event to a buffer (e.g., the first-in first-out queue), archive the event, etc. Thus, the event structure component 210 can compare fields or other data associated with an event to expected fields or data associated with an event structure and further process the event using a predetermined response rather than failing to transmit the event as in examples that do not implement the event structure component 210.

In various examples, functionality associated with the filter component 202, the data format component 204, the buffer component 206, the batch component 208, and/or the event structure component 210 can be implemented in an order that efficiently utilizes computational resources (e.g., processing resources, memory resource, and the like) across the components being implemented. For example, events can be buffered, batched, filtered, transformed, archived, etc. in a particular order to minimize an impact on the available computational resources. In one non-limiting example, the buffer component 206 can buffer events which can be available to batch using the batch component 208. In another example, the batch component 208 can batch events prior to the events being transformed using a compute service or the data format component 204.

The pipe component 122, the filter component 202, the data format component 204, the buffer component 206, the batch component 208, and/or the event structure component 210 can be associated with a resource name or other identifier that identifies the respective component. The event structure can include resource name information for components, services, applications, databases, etc. for a variety of reasons including to enable routing of an event to an intermediary service (if included for the event) and/or the destination. In some examples, a validation configuration can access the event structure (schema) usable to validate an event using a resource name assigned to the schema. In another example, the buffer can be associated with a resource name that can be included as part of the pipe characteristics so that events can be sent to the buffer. In some examples, the event structure can include fields that store values to indicate a resource name, an API, or other characteristics associated with components or services of the pipe.

Figure 3:
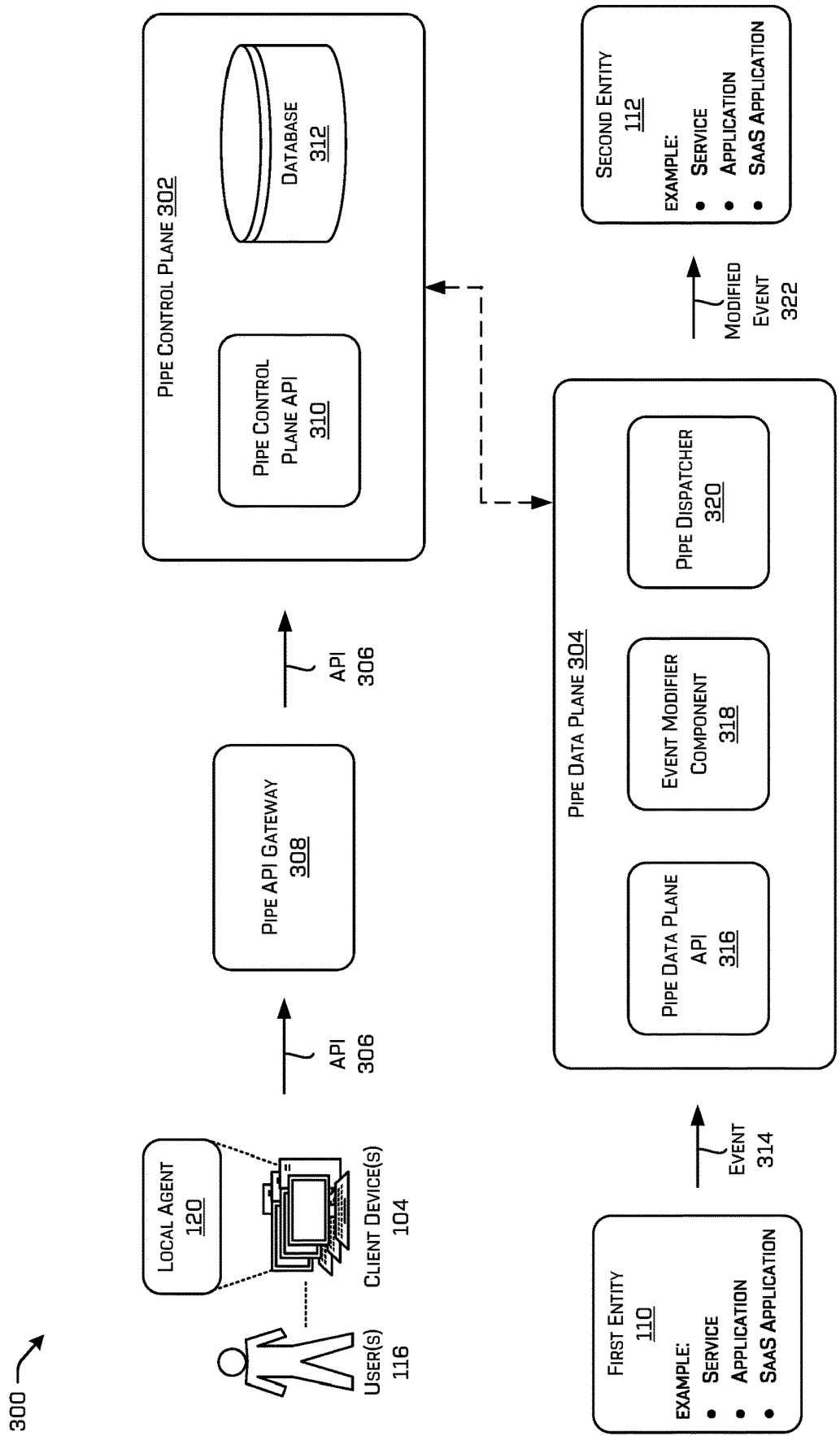
FIG. 3 illustrates a diagram of an example pipe between a first entity and a second entity in an example service provider network.

FIG. 3 illustrates a diagram 300 of an example pipe between a first entity and a second entity in an example service provider network. For example, the pipe 106 of FIG. 1 can represent a pipe control plane 302 and a pipe data plane 304 usable for transmitting event data associated with an event. Generally, the pipe control plane 302 operates to authorize the client device(s) (e.g., determines a customer account, validates a user, validates security credentials, etc.) and establish and manage the pipe data plane 304 which transmits the event data using the pipe 106.

As shown in FIG. 3, the client device(s) 104 can send an API 306 to a pipe API gateway 308 of the serverless computing environment 114 which forwards the API 306 to the pipe control plane API 310. In various examples, the API 306 can request establishing the pipe data plane 304. The pipe API gateway 308 can be configured to receive APIs that invoke functionality to configure the pipe data plane 304 of the pipe 106. The pipe control plane 302 can include the pipe control plane API to process the API 306 and a database 312 for storing information about event structures, pipes, and services (e.g., an association between an event structure and a pipe, characteristics of the pipe, characteristics of the services). For example, the database 312 can store event structure information defining characteristics of the event as well as an association between the event structure and a particular pipe. In some examples, information from the database 312 can be sent to the pipe data plane 304 based on, for example, the first entity 110 sending an event 314 to the pipe data plane 304 causing the pipe data plane 304 to send a request for the event structure information. More generally, FIG. 3 depicts a dashed line between the pipe control plane 302 and the pipe data plane 304 to represent one or more data transmissions.

Based on receiving the event 314, the pipe data plane 304 can implement a pipe data plane API 316 to process an API associated with the event 314. For example, the pipe data plane API 316 can authorize the API associated with the event 314, and initiate processing of the event 314. In some examples, the pipe data plane 304 can request event structure information (or other information such as data format information) from the database 312, and based at least in part on the request, receive information indicating whether to filter, buffer, batch, archive, or transform a data format of the event 314. In various examples, an event modifier component 318 can perform functionality associated with one or more of: the pipe component 122 or one or more of the filter component 202, the data format component 204, the buffer component 206, the batch component 208, and the event structure component 210 (e.g., depending upon information associated with the event).

The pipe data plane 304 can include a pipe dispatcher 320 that is configured to identify a destination for the event 314 and transmit a modified event 322 to the second entity 112. The modified event 322 can represent the event 314 after filtering, buffering, batching, archiving, and/or data format transforming. The event modifier component 318 can determine the modified event 322 based at least in part on the fields in the event structure indicating whether to perform one or more of: filtering, buffering, batching, archiving, and/or data format transforming. In a non-limiting example, the event modifier component 318 can generate the modified event 322 to include values for the fields in the event structure. For instance, the event modifier component 318 can transform the event 314 from a first data format to a second data format based on a field in the event structure having a value indicating to transform the event 314.

The pipe dispatcher 320 can also, or instead, be configured to determine an order for implementing the filter component 202, the data format component 204, the buffer component 206, the batch component 208, and/or the event structure component 210 to process the event 314. In various examples, the pipe dispatcher 320 can batch the event 314 with other events and transform a data format of a portion of the event 314 after batching to make efficient use of computational resources available in the serverless computing environment 114.

As mentioned, the event structure associated with the event structure component 210 can be stored in the database 312 for sending, however, in another example the event structure can be received and/or stored at the first entity 110, the second entity 112, the pipe component, or a component thereof. In some examples, the event structure can be stored as mentioned prior to receiving the event 314 so that a respective component can process the event based at least in part on information in the event structure.

In various examples, the database 312 can include characteristics of the event 314 such as one or more of: a first batch size of the event source, a first batch interval of the event source, a second batch size of the event destination, a second batch interval of the event destination, a queue to queue the event data, a name a time, a version, an account, or metadata, just to name a few. The characteristics of the event can be based at least in part on input from a user (e.g., the user 116) at a time prior to an occurrence of the event 314 (e.g., receiving the configuration data 212 of FIG. 2).

In some examples, the pipe dispatcher 320 can represent a microkernel architecture configured to integrate upstream and downstream services. For example, the pipe dispatcher 320 can represent an SPI (Service Provider Interface), or other interface, to route events to an intermediary service, application, and/or database between a source of an event and a destination of the event of a pipe. In other words, the pipe dispatcher 320 can manage sending and receiving data between the components of the pipe component 122, a third-party service, and/or a computing device including services invoked after the event is detected and before the event (or modified event) is received at the destination.

Figure 4:
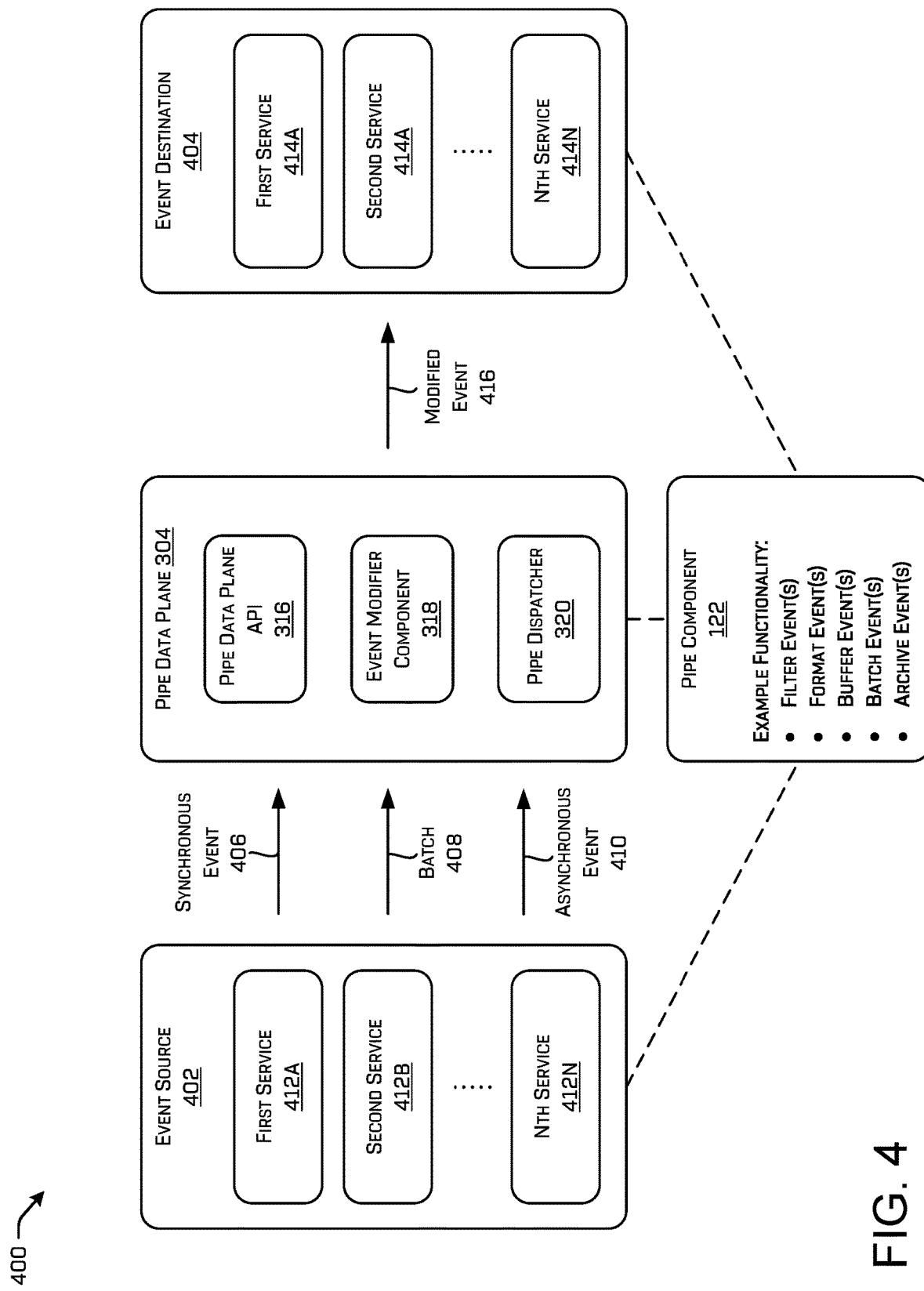
FIG. 4 illustrates a diagram of an example pipe for implementing the techniques described herein.

FIG. 4 illustrates a diagram 400 of an example pipe for implementing the techniques described herein. For example, the pipe data plane 304 of FIG. 3 can exchange event data between an event source 402 and an event destination 404. As shown in FIG. 3, the pipe component 122 of FIG. 1 can provide functionality to filter, format, buffer, batch, and/or archive event(s) at the event source 402, the pipe data plane 304, and/or the event destination 404. The event source 402 can represent the first entity 110, another pipe, or the client device(s) 104, and the event destination 404 can represent the second entity 112 or another pipe.

The event source 402 can include one or more a first service 412A, a second service 412B, up to an Nth service 412N, and the event destination 404 can include one or more a first service 414A, a second service 414B, up to an Nth service 414N, where N can be any integer greater than 1. Each service may be associated with a respective pipe data plane, and each pipe data plane is capable of performing synchronous and/or asynchronous invocations.

The pipe data plane 304 can receive a synchronous event 406, a batch 408, or an asynchronous event 410 from the event source 402 and use the event modifier component 318 to modify the synchronous event 406, the batch 408, or the asynchronous event 410 based at least in part on which functionality the event invokes (e.g., filtering, buffering, batching, etc.) and output a modified event 416. In examples that the event source 402 includes a single service (e.g., the first service 412A), each of the synchronous event 406, the batch 408, or the asynchronous event 410 can be processed by the pipe component 122 and sent to the event destination 404 as respective modified events 416. Thus, the pipe data plane 304 integrates services of the event source 402 and services of the event destination 404.

Figure 5:
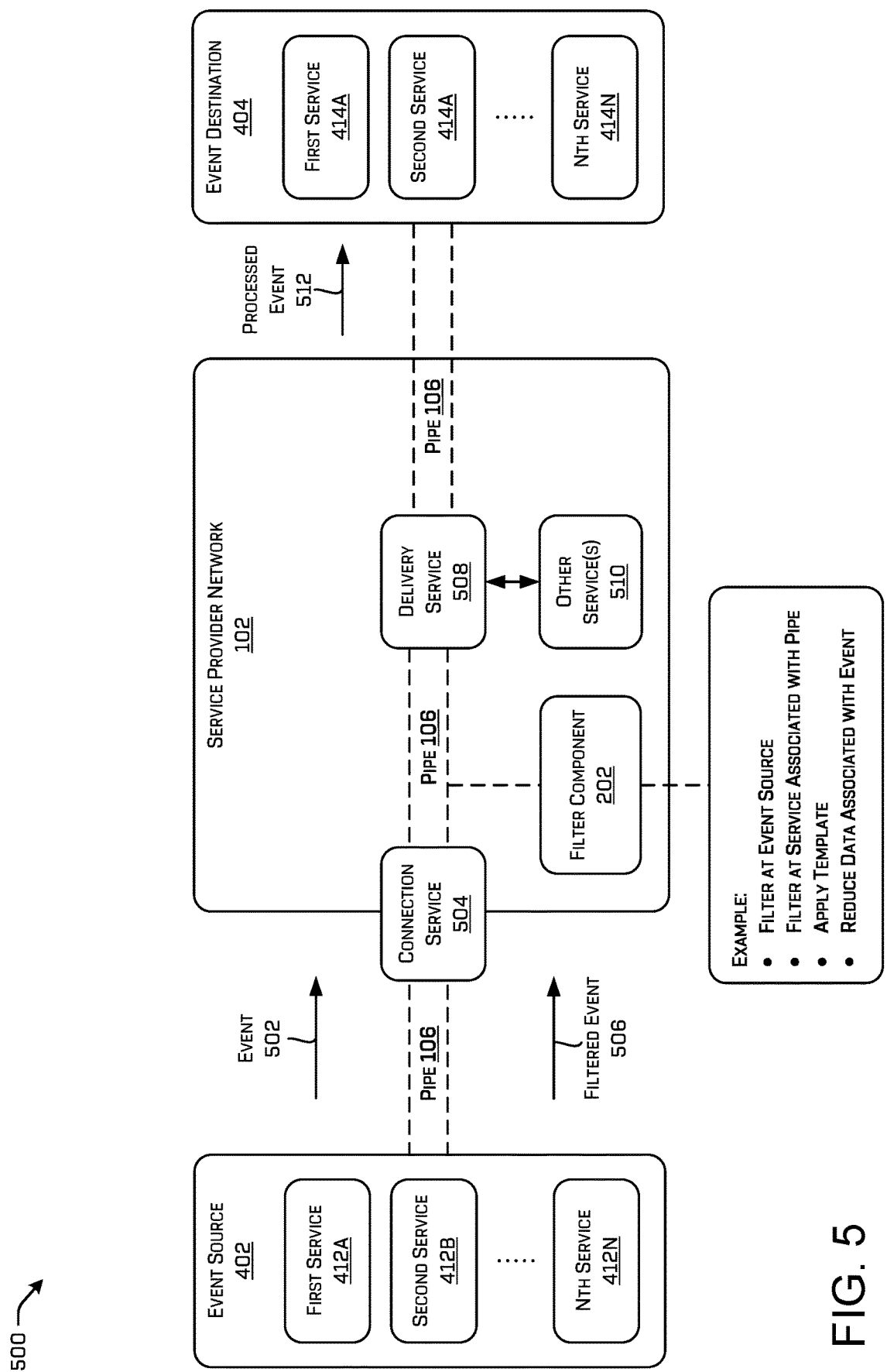
FIG. 5 illustrates a diagram of an example service provider network implementing an example pipe for filtering data between an event source and an event destination.

FIG. 5 illustrates a diagram of an example service provider network implementing an example pipe for filtering data between an event source and an event destination. For example, the service provider network 102 can include the pipe 106 and the filter component 202 to apply filtering techniques for an event at the event source 402. In some examples, an event 502 is sent from the event source 402 to a connection service 504 using the pipe 106 for filtering by the filter component 202 or a filter service of the service provider network 102. However, the filter component 202 can, in some examples, cause the event to be filtered at the event source 402 and a filtered event 506 is sent to the connection service 504 using the pipe 106. Thus, filtering can occur at different portions of the pipe 106 including at the event source 402 and/or an intermediary service(s).

FIG. 5 depicts the service provider network 102 comprising the connection service 504 to connect to the event source 402 to the pipe 106, a delivery service 508 to route event data using the pipe 106, and other service(s) 510 to perform other functionality associated with the pipe 106. The connection service 504 can represent an API gateway (e.g., the pipe API gateway 308, etc.) usable to invoke the pipe control plane 302 and/or the pipe data plane 304, for example. The delivery service 508 can be configured to send a processed event 512 to the event destination 404 and/or to route the event 502 and/or the filtered event 506 to the other service(s) 510. In some examples, the other service(s) 510 can represent a filter service (e.g., when the event 502 is sent from the event source 402) or other services such as a service to buffer, batch, transform, archive, etc. the filtered event 506. Thus, the pipe 106 of the service provider network 102 can be implemented to refrain from sending, remove, or rearrange event data associated with the event 502 for sending to the event destination 404.

Figure 6:
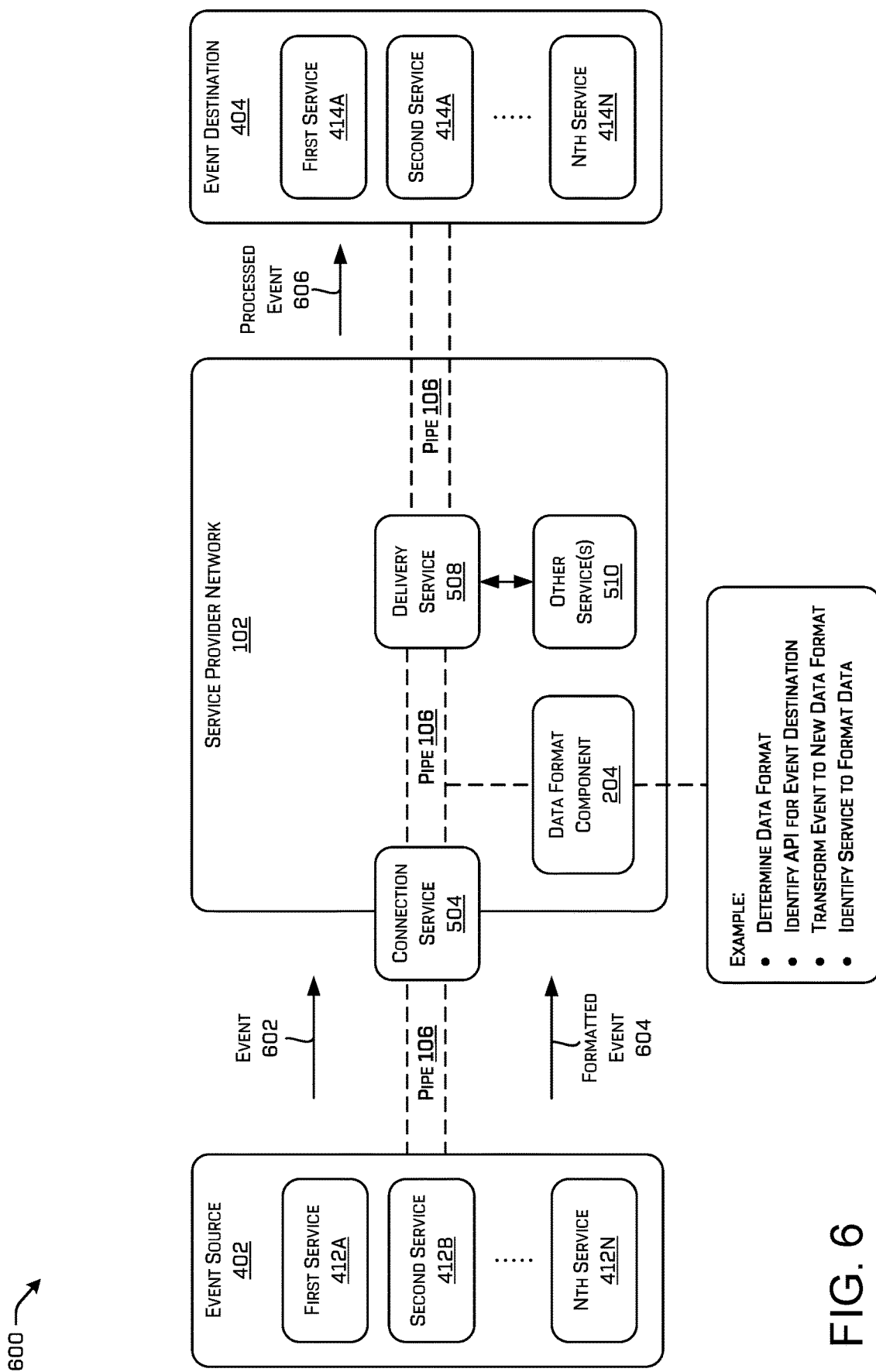
FIG. 6 illustrates a diagram of an example service provider network implementing an example pipe for determining a data format for transmitting an event between an event source and an event destination.

FIG. 6 illustrates a diagram of an example service provider network implementing an example pipe for determining a data format for transmitting an event between an event source and an event destination. For example, the service provider network 102 can include the pipe 106 and the data format component 204 to apply data formatting techniques for an event at the event source 402. In some examples, an event 602 is sent from the event source 402 to the connection service 504 using the pipe 106 for formatting by the data format component 204 or a compute service of the service provider network 102. However, the data format component 204 can, in some examples, cause the event 602 to be formatted at the event source 402 and a formatted event 604 is sent to the connection service 504 using the pipe 106. Thus, formatting can occur at different portions of the pipe 106 including at the event source 402 and/or an intermediary service(s) (e.g., the other service(s) 510).

FIG. 6 depicts the service provider network 102 comprising the connection service 504 to connect the event source 402 to the pipe 106 and the delivery service 508 to route event data using the pipe 106. The delivery service can also or instead route event data to one or more of the other service(s) 510 to perform other functionality associated with the pipe 106 or event. In various examples, the delivery service 508 can be configured to send a processed event 606 to the event destination 404 and/or to route the event 602 and/or the formatted event 604 to the other service(s) 510. In some examples, the other service(s) 510 can represent a service to determine a data format (e.g., when the event 602 is sent from the event source 402) or other services such as a service to buffer, batch, filter, archive, etc. the formatted event 604. The processed event 606 can therefore represent an event having a modified or transformed data format and/or an event this is transformed as well as batched, filtered, buffered, etc. depending upon the functionality associated with the pipe. Thus, the pipe 106 of the service provider network 102 can be implemented to change a compute service that processes the vent, transform an event to a new data format, and/or identify a service for formatting the event for sending to the event destination 404.

Figure 7:
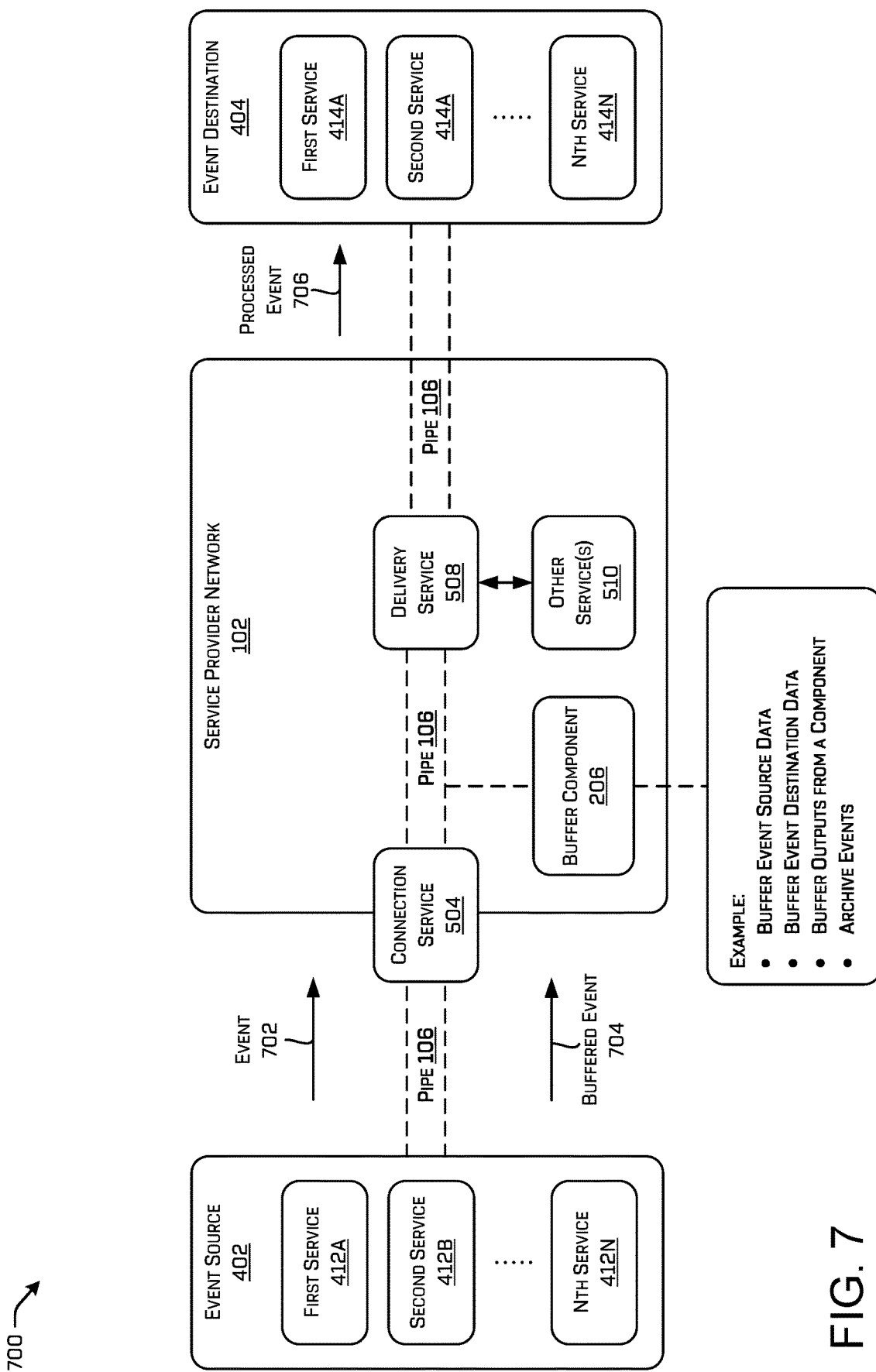
FIG. 7 illustrates a diagram of an example service provider network implementing an example pipe for buffering data between an event source and an event destination.

FIG. 7 illustrates a diagram of an example service provider network implementing an example pipe for buffering data between an event source and an event destination. For example, the service provider network 102 can include the pipe 106 and the buffer component 206 to apply buffering techniques for an event at the event source 402. In some examples, an event 702 is sent from the event source 402 to the connection service 504 using the pipe 106 for buffering by the buffer component 206 or a buffer service of the service provider network 102. However, the buffer component 206 can, in some examples, cause the event 602 to be buffered at the event source 402 and a buffered event 604 is sent to the connection service 504 using the pipe 106. Thus, buffering can occur at different portions of the pipe 106 including at the event source 402 and/or an intermediary service(s) (e.g., the other service(s) 510).

In various examples, the delivery service 508 can be configured to send a processed event 706 to the event destination 404 and/or to route the event 702 and/or the buffered event 704 to the other service(s) 510. In some examples, the other service(s) 510 can represent a buffer service to buffer the event 702 and/or other services such as a service to filter, batch, transform, archive, etc. the buffered event (e.g., buffered at the event source 402 as the buffered event 704 or buffered at a buffer service). The processed event 706 can therefore represent a buffered event and/or an event this is buffered as well as batched, filtered, transformed, etc. depending upon the functionality associated with the pipe 106. Thus, the pipe 106 of the service provider network 102 can be implemented to buffer event data at an event source, buffer event data at a service, buffer an output of a component (e.g., a component of the pipe component 122), or identify a service for buffering events prior to being sent to the event destination 404 using the pipe 106.

Figure 8:
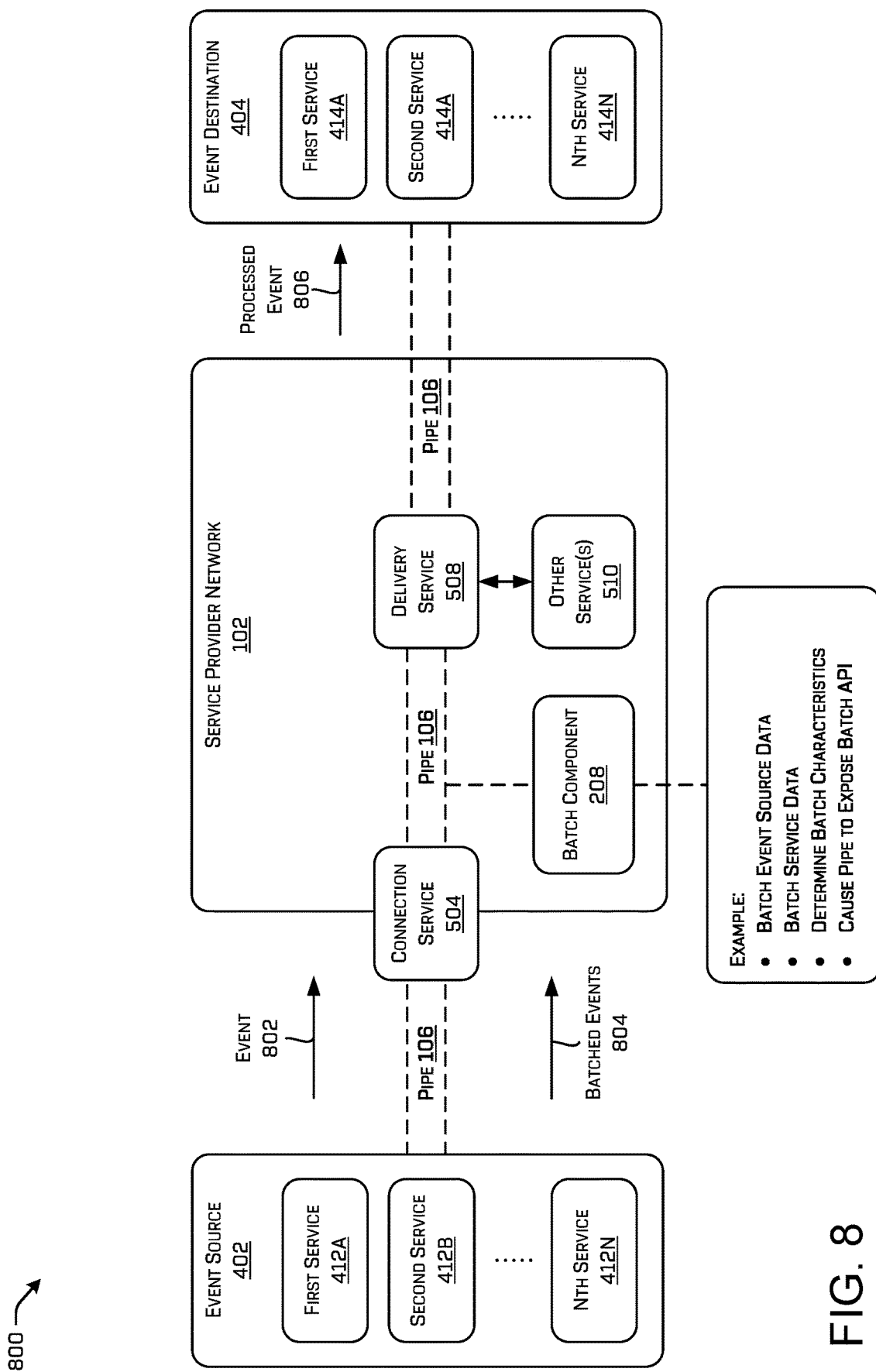
FIG. 8 illustrates a diagram of an example service provider network implementing an example pipe for batching data between an event source and an event destination.

FIG. 8 illustrates a diagram of an example service provider network implementing an example pipe for batching data between an event source and an event destination. For example, the service provider network 102 can include the pipe 106 and the batch component 208 to apply batching techniques for events at the event source 402 or other portion of the pipe 106. In some examples, an event 802 is sent from the event source 402 to the connection service 504 using the pipe 106 for batching by the batch component 208 or a batch service of the service provider network 102. However, the batch component 208 can, in some examples, cause the event 802 to be batched at the event source 402 and batched events 804 are sent to the connection service 504 using the pipe 106. Thus, batching can occur at different portions of the pipe 106 including at the event source 402 and/or an intermediary service(s) (e.g., the other service(s) 510).

In various examples, the delivery service 508 can be configured to send a processed event 806 to the event destination 404 and/or to route the event 802 and/or the batched events 804 to the other service(s) 510. In some examples, the other service(s) 510 can represent a batch service to batch the event 702 and/or other services such as a service to filter, buffer, transform, archive, etc. the batched events 804. The processed event 806 can therefore represent a batched event and/or an event this is batched as well as buffered, filtered, transformed, etc. depending upon the functionality associated with the pipe 106. Thus, the pipe 106 of the service provider network 102 can be implemented to batch event data at an event source, batch event data at a service, batch an output of a component (e.g., a component of the pipe component 122), or identify a service for batching events prior to being sent to the event destination 404 using the pipe 106.

Figure 9:
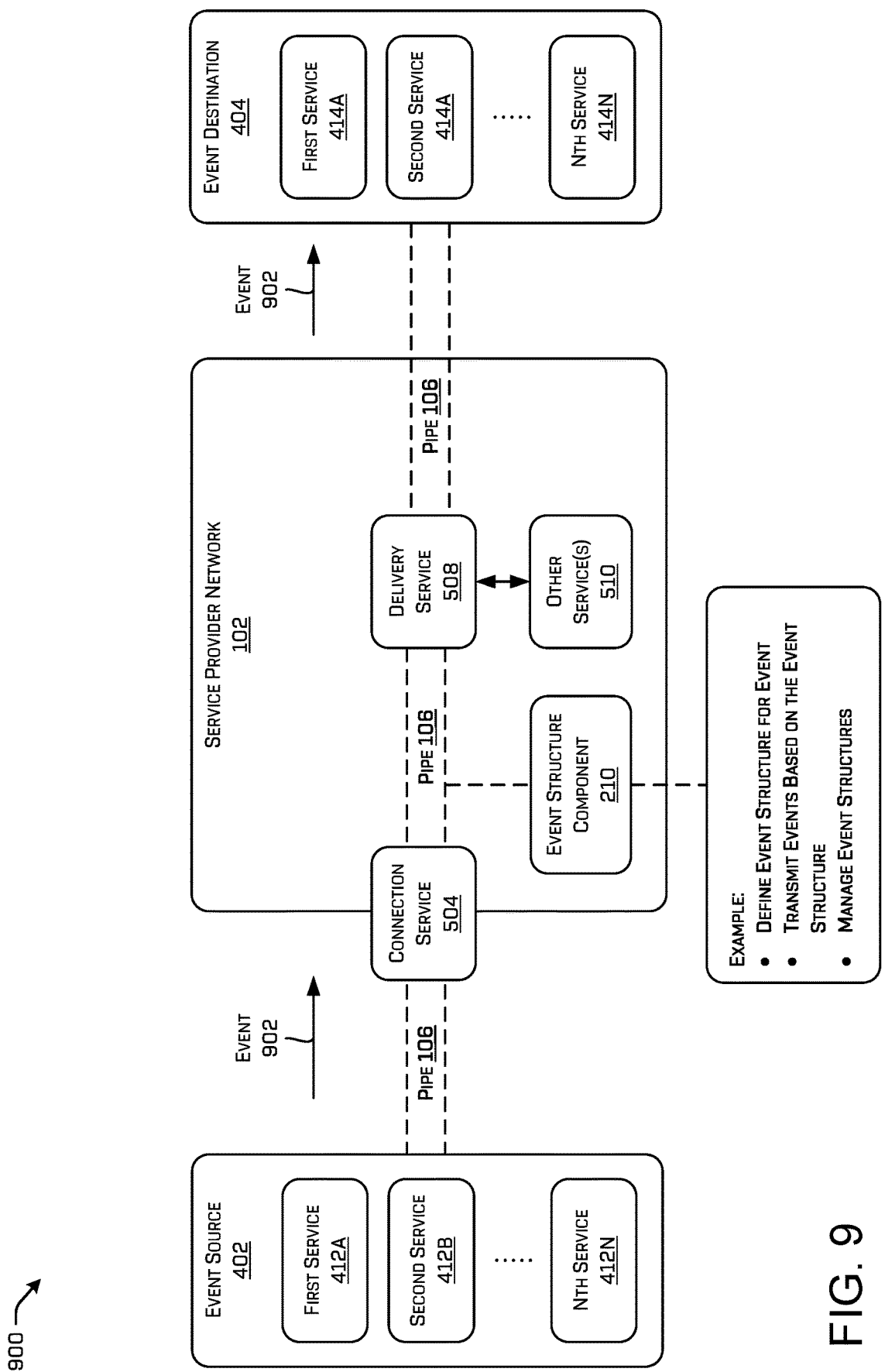
FIG. 9 illustrates a diagram of an example service provider network implementing an example pipe for transmitting an event based at least in part on an event structure that defines the event.

FIG. 9 illustrates a diagram of an example service provider network implementing an example pipe for transmitting an event based at least in part on an event structure that define the event. For example, the service provider network 102 can include the pipe 106 and the event structure component 210 to define an event 902 for sending from the event source 402 to the event destination 404. The event structure can represent a schema that identifies different event characteristics for consideration when generating, sending, or receiving an event using a particular pipe. The event structure may, in various examples, have portions or fields for storing values that represent characteristics of the event (e.g., an event name, a time, a version, an account, a source, a destination, metadata, a pipe name, a batch size, a batch interval, and/or a data format, just to name a few). Other components of the service provider network 102 including components of the pipe component 122 can access or receive the event structure from a database or a registry associated with the event structure component 210.

In some examples, the event 902 can be generated at the event source 402 based at least in part on the event structure. For instance, the event structure can define which changes in a dataset or a state trigger an event to cause the event source 402 to detect an occurrence of a future event that matches the event structure. The event structure can also store characteristics associated with one or more of: a source of the pipe, a destination of the pipe, a service or application accessible by the pipe that enable the pipe to transmit the event. The characteristics can include, for example, an identifier or resource name, an API, a data format, a batch size, a batch interval, and so on to support transmitting the events to the destination along with any optional services.

The event structure component 210 can, for example, compare a structure of the event 902 to the event structure and, based on the comparing, transmit event data when the structure of the event 902 is the same as the event structure or refrain from transmitting the event 902 when the structure of the event 902 is the same as the event structure. The event structure can, in some examples, identify how to manage events that differ from the event structure by enabling a user to indicate in a user interface an action to being unable to send an event (e.g., forward to the buffer, modify a compute resource, and so on).

In some examples, the event 902 can be modified after being generated at the event source 402 and before being sent to the event destination 404. For example, the event 902 can be filtered, transformed, batched, buffered, and/or archived, just to name a few. In such examples, modified event data can be sent to the event destination 404 instead of the event 902 as shown in FIG. 9. In some examples, the other service(s) 510 can represent a batch service to batch the event 902 and/or other services such as a service to filter, buffer, transform, archive, etc. the event 902.

FIGS. 10-14 illustrate flow diagrams of example methods 1000, 1100, 1200, 1300, and 1400 that illustrate aspects of the functions performed at least partly by the service provider network 102 as described in relation to FIG. 1 and elsewhere. The logical operations described herein with respect to FIGS. 10-14 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 10-14 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

In some examples, the techniques of methods 1000, 1100, 1200, 1300, and 1400 may be performed by a system comprising one or more processors and one or more computer-readable media storing computer-executable instructions that, when executed by the one or more processors, cause the one or more processors to perform the operations of the methods.

FIG. 10 illustrates a flow diagram of an example method performed by a service provider network for filtering data associated with an example pipe. For example, the service provider network 102 can implement the pipe 106 to filter events transmitted between a source (e.g., a service, an application, another pipe) and a destination (also referred to herein as a target).

At 1002, a service provider network may receive first data indicating a first event service as a source for sending event data associated with an event, the event representing a change in a resource state, second data indicating a second event service as a target for receiving the event data associated with the event, and third data indicating a filter to apply to the event data. For instance, the pipe component 122 can receive configuration data 212 from the client device(s) 104 and/or an event structure indicating a source (e.g., the first entity 110) of an event for sending event data associated with an event. In some examples, the first data can be received from a user of the client device(s) 104 at a previous time. The first data may also or instead be associated with an event structure and the first data can be received from the event structure component 210, for example.

The service provider network may receive second data indicating a second event service as a target for receiving the event data associated with the event. For instance, the pipe component 122 can receive configuration data 212 from the client device(s) 104 and/or the event structure indicating a target or destination (e.g., the second entity 112) to receive the event data associated with the event. The second data can represent a previous input from a user, such as a developer an application or service associated with the client device(s) 104 such as when the user initiates setting up a pipe or modifying a pipe. The second data may also, or instead, be identified or received in associated with an event structure.

The service provider network may receive third data indicating a filter to apply to the event data. For instance, the client device(s) 104 can send configuration data 212 to the pipe component 122 and/or to the filter component 202 indicating a filter to apply to an upcoming event to be transmitted using the pipe. For instance, the configuration data 212 can include one or more filters to apply to the event such as a payload filter that causes the event data to adhere to a specific payload size for transferring using the pipe. In some examples, examples, the filter component 202 can apply a filter to trim or otherwise select portions of the event data to include or exclude for transmitting as filtered event data to the target. In other examples, the second data can be received from the event structure and filter information can be stored as one or more fields of the event structure as described herein.

At 1004, a pipe component associated with the service provider network may configure a pipe between the first event service and the second event service based on the first data, the second data, and the third data. The pipe can represent, for example, a virtual communication channel for sending the event data associated with the event, the pipe configured between the first event service and the second event service independent of (free of, without requiring, etc.) a developer providing computer-readable instructions to the first event service (e.g., to configure the pipe). For instance, the pipe component 122 can configure the pipe to include filtering techniques based at least in part on receiving source, target, and filter information from previous input from the user conveying preferences for how to configure the pipe. Generally, the pipe can represent a data plane for exchanging event data associated with the event with various services.

In some examples, the filtering techniques can be applied to the pipe based at least in part on identifying the source, the target, and the filter information from the event structure that defines the event. In various examples, the user, or developer, need not provide computer-readable instructions (e.g., integration code to connect the first event service with the target) and instead the filter component 202 can identify and apply the filter(s).

At 1006, the service provider network may receive an indication of the event at the first event service. For instance, the service provider network 102 can receive an API from the first event service at an API gateway and forward the event to the pipe component 122 for processing.

At 1008, the service provider network may determine, by the filter and as filtered event data, a modification to the event data based on the indication of the event. For instance, the filter component 202 may apply one or more filters to the event based at least in part on one or more filtering rules identified in the configuration data 212 and/or the event structure associated with the event. In some examples, the event can represent the event 314 and the filter component 202 (or functionality thereof) can be included in the event modifier component 318 for applying the appropriate filters.

At 1010, the service provider network may send, by the first event service and via the pipe, the filtered event data to the second event service based on the indication of the event. For instance, the pipe component 122 can cause the filtered event data to transmit from the first entity 110 to the second entity 112 using the pipe 106. In some examples, the pipe dispatcher 320 can forward the filtered event data from the filter component 202 to the second entity 112 though in other examples the filtered event data can be transmitted directly from the filter component 202.

Figure 11:
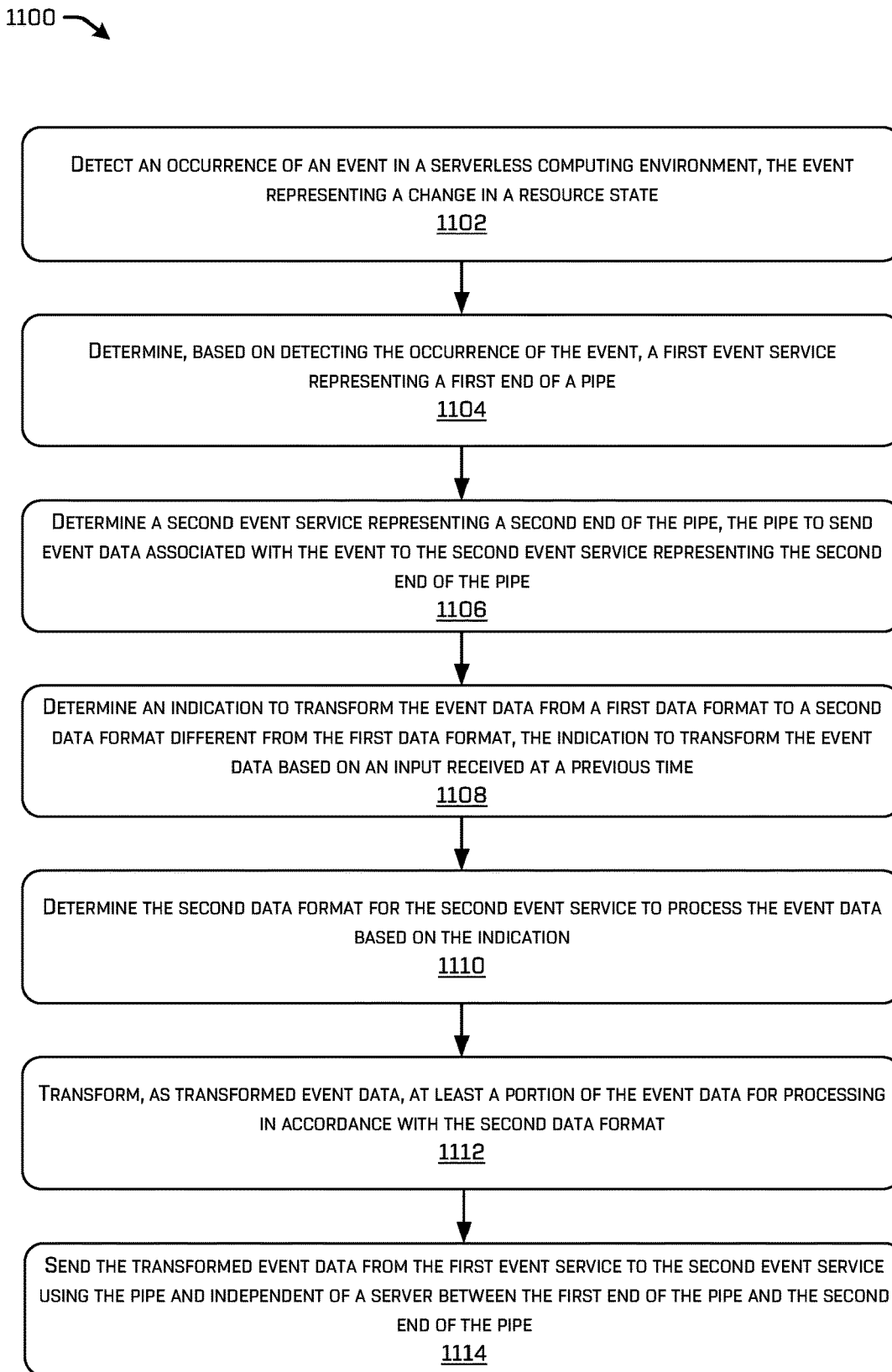
FIG. 11 illustrates a flow diagram of an example method performed by a service provider network for determining a data format for transmitting an event using an example pipe.

FIG. 11 illustrates a flow diagram of an example method performed by a service provider network for determining a data format for transmitting an event using an example pipe. For example, the service provider network 102 can implement the pipe 106 to determine a data format usable for an event destination to process an event sent from an event source.

At 1102, a service provider network may detect an occurrence of an event in a serverless computing environment, the event representing a change in a resource state. For instance, the pipe component 122 can receive an API indicating an event at a source (e.g., the first entity 110). In various examples, the event may be generated at the first entity 110 based at least in part on determining a change in a resource state related to a field of an event structure that defines the event.

At 1104, the service provider network may determine, based on detecting the occurrence of the event, a first event service representing a first end of a pipe. For instance, the pipe component 122 can determine a source of an event (e.g., the first entity 110) based at least in part on configuration data 212 from the client device(s) 104 and/or an event structure indicating a source of an event.

At 1106, the service provider network may determine a second event service representing a second end of the pipe, the pipe to send event data associated with the event to the second event service representing the second end of the pipe. For instance, the pipe component 122 can determine a destination of the event (e.g., the second entity 112) based at least in part on configuration data 212 from the client device(s) 104 and/or an event structure indicating the destination of the event.

At 1108, a pipe component associated with the service provider network may determine an indication to transform the event data from a first data format to a second data format different from the first data format. For instance, the data format component 204 can determine that a current data format associated with the event is unable to be processed by the destination, and output an indication to transform the event data to another data format usable by the destination. In some example, the indication to transform the event data can be based on an input received at a previous time such as input indicating a compute service or program interface to process the event data by the second event service (associated with a previous input from a user (e.g., the user 116). In some examples, the data format techniques can be applied to the pipe 106 (or events associated therewith) based at least in part on identifying the data format (e.g., a programming language, an API, a kernel, or the like) from the event structure that defines the event. In various examples, the user, or developer, need not provide computer-readable instructions, such as an API, to transform a data format responsive to detecting the event.

At 1110, a data format component of the service provider network may determine the second data format for the second event service to process the event data based on the indication. For instance, data format component 204 can determine the data format that the second entity 112 can process responsive to receiving the event (e.g., to send acknowledgement of receiving the event, for example). In some examples, the data format component 204 can access mapping data from a database (e.g., the database 312) to map data formats to different services, applications, etc. and use the mapped data to select the data format native to target or destination. In some examples, the data format component 204 may query the database 312 to identify a rule associated with, or mapped to, an API call.

At 1112, the data format component of the service provider network may transform, as transformed event data, at least a portion of the event data for processing in accordance with the second data format. For instance, the data format component 204 may convert portions of the event (e.g., a subset of data that requires transformation) from the first data format to the second data format.

At 1114, the service provider network may send the transformed event data from the first event service to the second event service using the pipe and independent of a server between the first end of the pipe and the second end of the pipe. For instance, the pipe component 122 can cause the transformed event data to transmit from the first entity 110 to the second entity 112 using the pipe 106. In some examples, the pipe dispatcher 320 can forward the transformed event data from the data format component 204 to the second entity 112.

Figure 12:
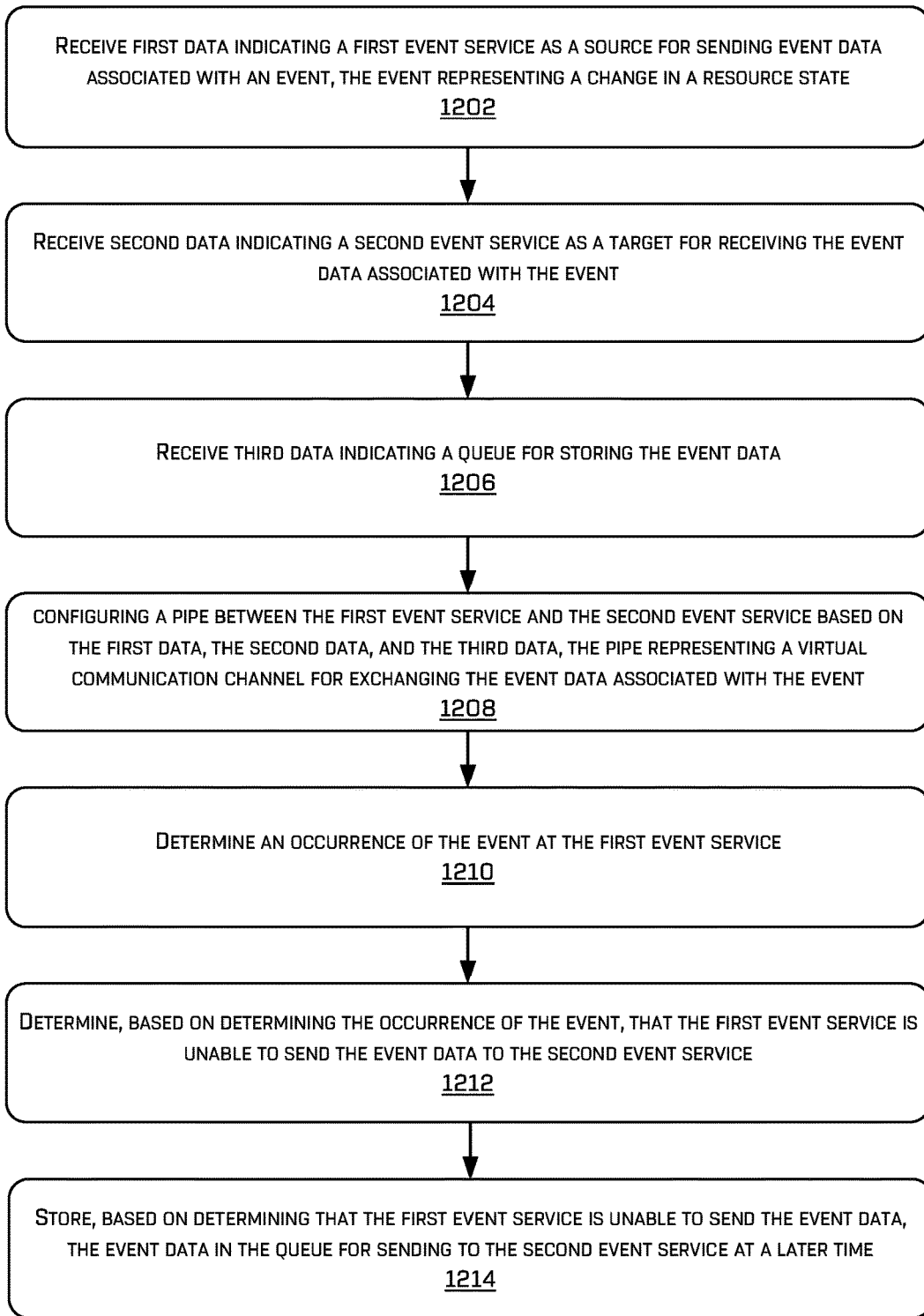
FIG. 12 illustrates a flow diagram of an example method performed by a service provider network for implementing a buffer to capture events associated with an example pipe.

FIG. 12 illustrates a flow diagram of an example method performed by a service provider network for implementing a buffer to capture events associated with an example pipe. For example, the service provider network 102 can implement the pipe 106 to buffer an event generated at an event source.

At 1202, a service provider network may receive first data indicating a first event service as a source for sending event data associated with an event, the event representing a change in a resource state. For instance, the pipe component 122 can receive configuration data 212 from the client device(s) 104 and/or an event structure indicating a source (e.g., the first entity 110) of an event for sending event data associated with an event. In some examples, the first data can be received from a user of the client device(s) 104 at a previous time. The first data may also, or instead, be associated with an event structure and the first data can be receive from the event structure component 210, for example.

At 1204, the service provider network may receive second data indicating a second event service as a target for receiving the event data associated with the event. For instance, the pipe component 122 can receive configuration data 212 from the client device(s) 104 and/or an event structure indicating a target or destination (e.g., the second entity 112) to receive the event data associated with an event. The second data can represent a previous input from a user, such as a developer an application or service associated with the client device(s) 104 such as when the user initiates setting up a pipe or modifying a pipe. The second data may also, or instead, be identified or received from an event structure.

At 1206, the service provider network may receive third data indicating a queue for storing the event data. For instance, the client device(s) 104 can send configuration data 212 to the pipe component 122 and/or to the buffer component 206 indicating a queue to apply to an upcoming event to be transmitted using the pipe. For instance, the configuration data 212 can include one or more buffering rules to apply to the event such as a rule to determine when to initiate buffering, how long to store data in the buffer, a type of buffer to use, and the like. In other examples, the second data can be received from the event structure and buffer information can be stored as one or more fields of the event structure.

At 1208, a pipe component associated with the service provider network may configure a pipe between the first event service and the second event service based on the first data, the second data, and the third data, the pipe disposed the first event service and the second event service independent of receiving computer-readable instructions from a developer implementing the first event service. For instance, the pipe component 122 can configure the pipe to include buffering techniques based at least in part on receiving source, target, and buffer information from previous input from the user conveying preferences for how to configure the pipe for buffering. Generally, the pipe can represent a virtual communication channel for exchanging event data associated with the event between a source and a target. The pipe may also enable communications with one or more services that may support functionality implemented by the pipe component 122 including the buffer component 206. In some examples, the buffering techniques can be applied to the pipe 106 based at least in part on identifying the source, the target, and the buffer information from the event structure that defines the event.

At 1210, the service provider network may determine an occurrence of the event at the first event service. For instance, the service provider network 102 can receive an API from the first event service at an API gateway and forward the event to the pipe component 122 for processing. In various example, the event occurs after configuring the pipe.

At 1212, a buffer component of the service provider network may determine, based on determining the occurrence of the event, that the first event service is unable to send the event data to the second event service. For instance, the buffer component 206 may capture events by the queue based at least in part on one or more buffering rules identified in the event structure or otherwise associated with the pipe 106. In some examples, the event can represent the event 314 and the buffer component 206 (or functionality thereof) can be included in the event modifier component 318 which can buffer the events.

At 1214, the service provider network may store, based on determining that the first event service is unable to send the event data, the event data in the queue for sending to the second event service at a later time. For instance, the buffer component 206 can send the buffered event data from the first entity 110 to the second entity 112 using the pipe 106. In some examples, the pipe dispatcher 320 can forward the filtered event data from the filter component 202 to the second entity 112 though in other examples the event data can be transmitted directly from the buffer component 206.

FIG. 13 illustrates a flow diagram of an example method performed by a service provider network for batching events for transmission using an example pipe. For example, the service provider network 102 can implement the pipe 106 to batch events for transmission using the pipe 106.

At 1302, a service provider network may identify multiple events at a first event service for sending to a second event service in a serverless computing environment, an event of the multiple events representing a change in a resource state. For instance, the pipe component 122 can determine that at least some of the multiple events are configured to be included in a batch based at least in part on configuration data 212 from the client device(s) 104 and/or an event structure indicating whether or not to batch an event associated with a particular pipe. In some examples, the first data can be received from a user of the client device(s) 104 at a previous time. The first data may also, or instead, be associated with an event structure and the first data can be receive from the event structure component 210, for example.

At 1304, the service provider network may determine, based on identifying the multiple events, a configuration value of a pipe representing a virtual communication channel for transferring event data associated with the multiple events between the first event service and the second event service. For example, the configuration value can identify that the pipe 106 is configured to provide batching functionality at the first event service (e.g., the first entity 110) and/or the second event service (e.g., the second entity 112). In various examples, the pipe can be disposed between the first event service and the second event service based at least in part on receiving input data at a previous time indicating a) the first event service as a source of the multiple events b) the second event service as a target of the multiple events, and c) to perform batching at one or more of: the first event service or the second event service.

At 1306, a batching component of the service provider network may determine, based on the configuration value of the pipe, one or more batching rules for batching the multiple events. For instance, the client device(s) 104 can send configuration data 212 to the pipe component 122 and/or to the batch component 208 indicating how to batch upcoming events for transmission using the pipe. For instance, the configuration data 212 can include one or more batch rules to apply to the event such as a first maximum payload of the first event service, a second maximum payload of the second event service, a first maximum batch size of the first event service, or a second maximum batch size of the second event service. In some examples, the pipe component 122 can receive configuration data 212 from the client device(s) 104 and/or an event structure indicating one or more batch rules associated with the pipe 106. The one or more batch rules can be based at least in part on a previous input from a user, such as a developer an application or service associated with the client device(s) 104 (e.g., when the user initiates setting up a pipe or modifying a pipe).

At 1308, a pipe component associated with the service provider network may expose, by the pipe, a batch Application Program Interface (API). For instance, the pipe component 122 can expose a batch API to invoke batching functionality associated with the first entity 110 and/or the second entity 112.

At 1310, the service provider network may determine a batch size for a portion of the multiple events based on the one or more batching rules and the batch API. For instance, the batch component 208 can determine a batch size, a batch interval, or other batch characteristics based on the one or more batch rules. In some examples, the batch size can be the smaller of a batch size associated with the first entity 110 or a batch size associated with the second entity 112 (as determined by the event structure, for example)

At 1312, the service provider network may send, from the first event service to the second event service, the portion of the multiple events over the pipe in a batch based on the batch size. For instance, the pipe component 122 can cause batched event data to transmit from the first entity 110 to the second entity 112 using the pipe 106.

Figure 14:
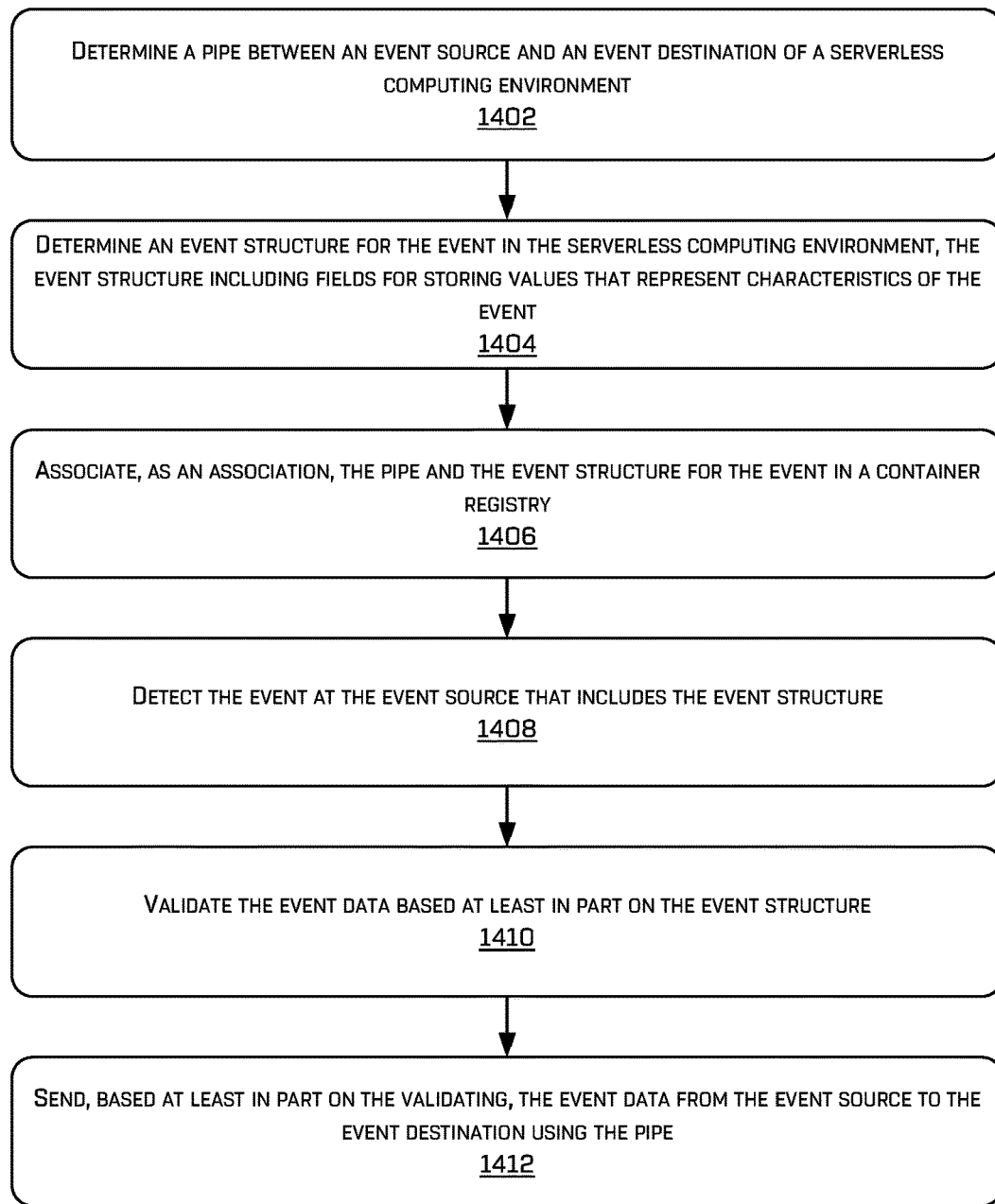
FIG. 14 illustrates a flow diagram of an example method performed by a service provider network for defining event data of an event for transmission using an example pipe.

FIG. 14 illustrates a flow diagram of an example method performed by a service provider network for defining events for transmission using an example pipe. For example, the service provider network 102 can implement the pipe 106 to define an event structure for events transmitted using the pipe 106.

At 1402, a service provider network may determine a pipe between an event source and an event destination of a serverless computing environment, the pipe representing a virtual communication channel for transmitting event data associated with an event. The event can represent a change in a resource state. In some examples, the pipe component 122 can receive configuration data 212 from the client device(s) 104 indicating a source (e.g., the first entity 110) of an event and a destination of the event (e.g., the second entity 112). In some examples, the pipe 106 can be determined based at least in part on input from a user of the client device(s) 104 at a previous time.

At 1404, an event structure component of the service provider network may determine an event structure for the event in the serverless computing environment. For instance, the event structure component 210 can determine the event structure to include fields for storing values that represent characteristics of the event comprising: a source, a destination, a pipe name, and a data format (e.g., a programming language, an API, or a kernel for processing the event data). In various examples, the characteristics of the event can also comprise one or more of: a first batch size of the event source, a first batch interval of the event source, a second batch size of the event destination, a second batch interval of the event destination, a queue to queue the event data, a name a time, a version, an account, metadata, and so on. For instance, the pipe component 122 can receive configuration data 212 from the client device(s) 104 and determine the event structure to define characteristics of the event based at least in part on the configuration data 212. In some examples, the event structure can include a validation configuration comprising a setting, a threshold, or other information usable to validate event data before sending from the first entity 110 to the second entity 112. The serverless computing environment can present an evet-driven architecture that exchanges events between the source and the destination using the pipe 106.

At 1406, the event structure component of the service provider network may associate, as an association, the pipe and the event structure for the event in a container registry. For instance, the event structure component 210 can store the event structure in the container registry that is accessible to other components of the service provider network (e.g., the pipe component 122) that includes an association between a name of the pipe and the event structure.

At 1408, a pipe component associated with the service provider network may detect the event at the event source that includes the event structure. For instance, the pipe component 122 can receive an API indicating an event at a source (e.g., the first entity 110). In various examples, the event may be generated at the first entity 110 based at least in part on determining a change in a resource state related to a field of an event structure that defines the event.

At 1410, the service provider network may validate the event data based at least in part on the event structure. For instance, the first entity 110 can generate the event, and the pipe component 122 can compare an event structure of the event to the event structure associated with the pipe 106 to determine that the event data matches the event structure and outputting a first indication to send the event data to the event destination or determining that the event data does not match the event structure and outputting a second indication to refrain from sending the event data to the event destination.

At 1412, the service provider network may send, based at least in part on the validating, the event data from the event source to the event destination using the pipe. For instance, the pipe component 122 can cause the generated event data to transmit from the first entity 110 to the second entity 112 using the pipe 106 based at least in part on the first indication.

Figure 15:
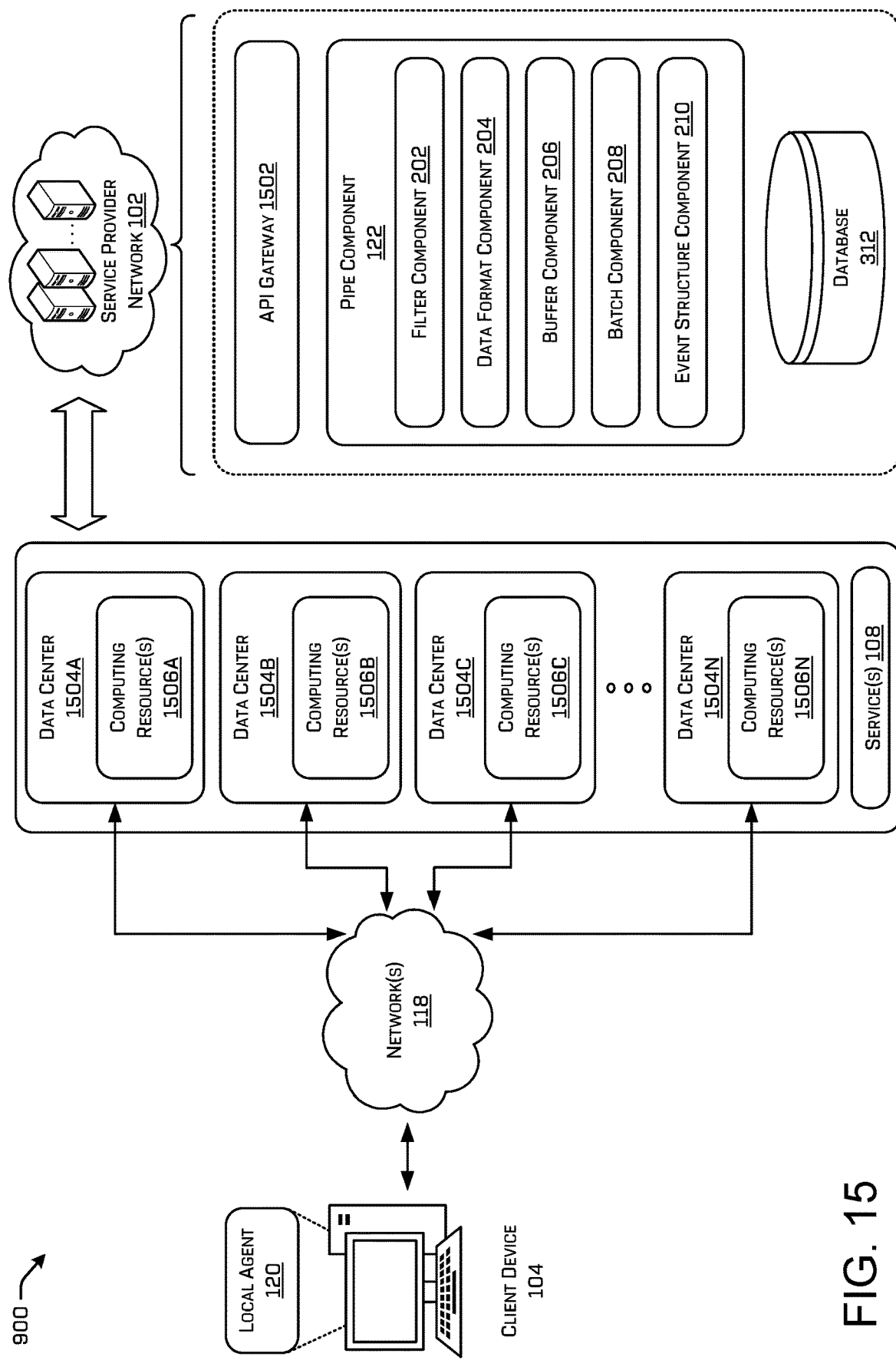
FIG. 15 illustrates a system and network diagram of an example operating environment that includes a service provider network for implementing the techniques described herein.

FIG. 15 illustrates a system and network diagram 1500 of an example operating environment that includes a service provider network (that may be part of or associated with a cloud-based service network/platform) for implementing the techniques described herein. The service provider network 102 can include an API gateway 1502 may receive an API call and route the API call to a component or service. In various examples, the service provider 102 can include the pipe component 122 which comprises the filter component 202, the data format component 204, the buffer component 206, the batch component 208, and the event structure component 210.

The service provider network 102 can provide computing resources 1506, like VM instances, containers, serverless functions, storage, etc., on a permanent or an as-needed basis. Among other types of functionality, the computing resources 1506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include the database 312. The service provider network 102 can also be configured to provide other types of computing resources not mentioned specifically herein.

The computing resources 1506 provided by the service provider network 102 may be enabled in one embodiment by one or more data centers 1504A-1504N (which might be referred to herein singularly as "a data center 1504" or in the plural as "the data centers 1504"). The data centers 1504 are facilities utilized to house and operate computer systems and associated components. The data centers 1504 typically include redundant and backup power, communications, cooling, and security systems. The data centers 1504 can also be located in geographically disparate locations. One illustrative embodiment for a data center 1504 that can be utilized to implement the technologies disclosed herein will be described below with regard to FIG. 16.

The data centers 1504 may be configured in different arrangements depending on the service provider network 102. For example, one or more data centers 1504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 1506 provided by the data centers 1504 of the service provider network 102 over any wired and/or wireless network(s) 118 (utilizing a client device 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. It should be appreciated that a local-area network ("LAN"), the Internet, or any other networking topology known in the art that connects the data centers 1504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 16:
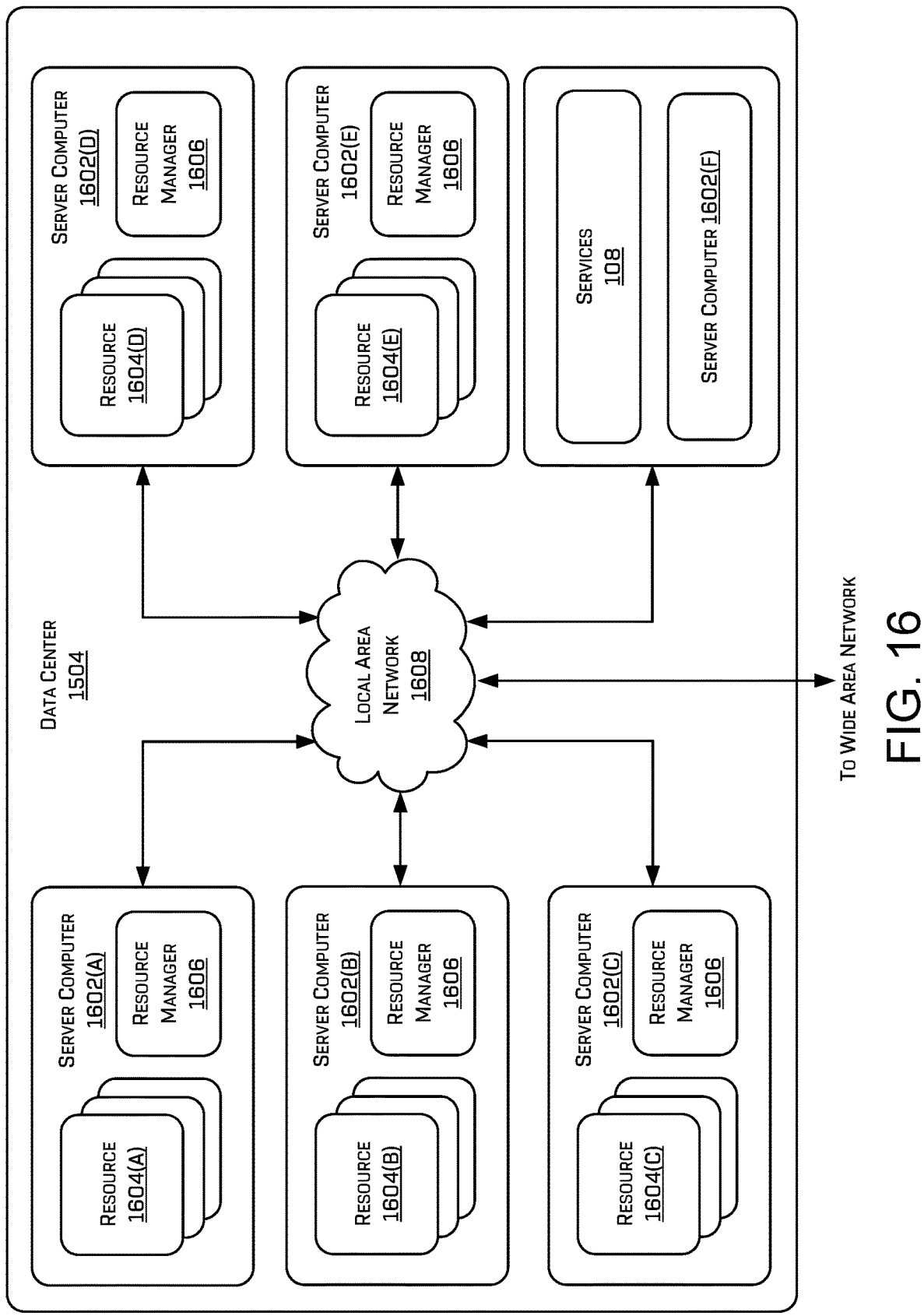
FIG. 16 illustrates a computing system diagram illustrating a configuration for a data center that can be utilized to implement aspects of the techniques disclosed herein.

FIG. 16 illustrates a computing system diagram illustrating a configuration for a data center that can be utilized to implement the techniques disclosed herein. The example data center 1504 shown in FIG. 16 includes several server computers 1602A-1602F (which might be referred to herein singularly as "a server computer 1602" or in the plural as "the server computers 1602") for providing computing resources 1604A-1604E. In some examples, the resources 1604 may include, or correspond to, resources associated with the pipe component 122 or a component thereof.

The server computers 1602 can be standard tower, rack-mount, or blade server computers configured appropriately for providing the computing resources described herein (illustrated in FIG. 16 as the computing resources 1604A-1604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1602 can also be configured to execute a resource manager 1606 capable of instantiating and/or managing the computing resources. In the case of VM instances, for example, the resource manager 1606 can be a hypervisor or another type of program configured to enable the execution of multiple VM instances on a single server computer 1602. Server computers 1602 in the data center 1504 can also be configured to provide network services and other types of services, some of which are described in detail below with regard to FIG. 17.

The data center 1504 shown in FIG. 16 also includes a server computer 1602F that can execute some or all of the software components described above. For example, and without limitation, the server computer 1602F can be configured to execute components of the service provider network 102, including the services 108.

In the example data center 1504 shown in FIG. 16, an appropriate LAN 1608 is also utilized to interconnect the server computers 1602A-1602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1504A-1504N, between each of the server computers 1602A-1602F in each data center 1504, and, potentially, between computing resources in each of the server computers 1602. It should be appreciated that the configuration of the data center 1504 described with reference to FIG. 16 is merely illustrative and that other implementations can be utilized.

Figure 17:
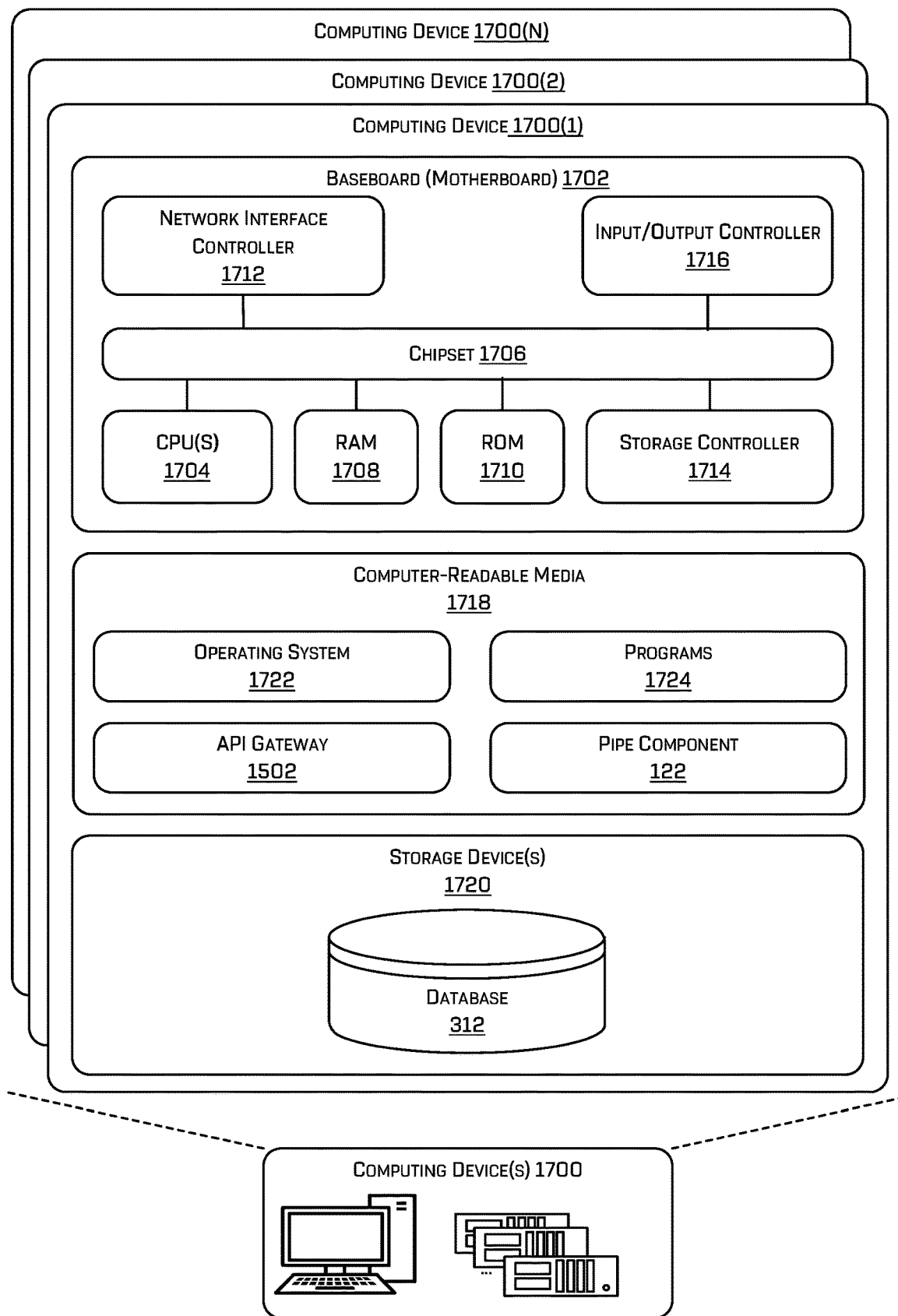
FIG. 17 is a computer architecture diagram showing an illustrative computer hardware architecture for implementing a computing device that can be utilized to implement aspects of the techniques disclosed herein.

FIG. 17 is a computer architecture diagram showing an illustrative computer hardware architecture for implementing one or more computing devices 1700 that can be utilized to implement the techniques disclosed herein. The computer architecture shown in FIG. 17 illustrates a conventional server computer, workstation, desktop computer, laptop, tablet, network appliance, e-reader, smartphone, or other computing device, and can be utilized to execute any of the software components presented herein.

The computing device 1700 includes a baseboard 1702, or "motherboard," which is a printed circuit board to which a multitude of components or devices can be connected by way of a system bus or other electrical communication paths. In one illustrative configuration, one or more central processing units ("CPUs") 1704 operate in conjunction with a chipset 1706. The CPUs 1704 can be standard programmable processors that perform arithmetic and logical operations necessary for the operation of the computing device 1700.

The CPUs 1704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1706 provides an interface between the CPUs 1704 and the remainder of the components and devices on the baseboard 1702. The chipset 1706 can provide an interface to a RAM 1708, used as the main memory in the computing device 1700. The chipset 1706 can further provide an interface to a computer-readable storage medium such as a read-only memory ("ROM") 1710 or non-volatile RAM ("NVRAM") for storing basic routines that help to startup the computing device 1700 and to transfer information between the various components and devices. The ROM 1710 or NVRAM can also store other software components necessary for the operation of the computing device 1700 in accordance with the configurations described herein.

The computing device 1700 can operate in a networked environment using logical connections to remote computing devices and computer systems through a network, such as the network 118. The chipset 1706 can include functionality for providing network connectivity through a network interface controller (NIC) 1712, such as a gigabit Ethernet adapter. The NIC 1712 is capable of connecting the computing devices 1700 over the network 118. It should be appreciated that multiple NICs 1712 can be present in the computing device 1700, connecting the computer to other types of networks and remote computer systems.

The computing device 1700 can be connected to one or more computer-readable media 1718 storing software components for the computer device 1700, and one or more mass storage devices 1720 for storing data. The computer-readable storage media 1718 can store an operating system 1722, programs 1724, the API gateway 1502, and the pipe component 122, which have been described in greater detail herein. The mass storage device 1720 can be connected to the computing device 1700 through a storage controller 1714 connected to the chipset 1706. The mass storage device 1720 can consist of one or more physical storage units. The storage controller 1714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 1718 may store the components described herein as executable, computer-readable instructions. For instance, the components may include the API gateway 1502, the pipe component 122, or components associated with the pipe component 122. The components may be stored and/or executed on a single server, or on a system of two or more computing devices 1700.

The computing device 1700 can store data on the mass storage device 1720 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1720 is characterized as primary or secondary storage, and the like.

For example, the computing device 1700 can store information to the mass storage device 1720 by issuing instructions through the storage controller 1714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 can further read information from the mass storage device 1720 by detecting the physical states or characteristics of one or more particular locations within the physical storage units.

In addition to the mass storage device 1720 described above, the computing device 1700 can have access to the computer-readable storage media 1718 to store and retrieve information, such as program modules, event structures, or other data. It should be appreciated by those skilled in the art that computer-readable storage media is any available media that provides for the non-transitory storage of data and that can be accessed by the computing device 1700. In some examples, the operations performed by the service provider network 102, and or any components included therein, may be supported by one or more devices similar to computing device 1700. Stated otherwise, some or all of the operations performed by the service provider network 102, and or any components included therein, may be performed by one or more computer devices 1700 operating in a cloud-based arrangement. As shown, the storage device 1720 may store the database 312 that includes information about event structures, pipes, and services (e.g., an association between an event structure and a pipe, characteristics of the pipe, characteristics of the services) as well as rules and access policies.

By way of example, and not limitation, computer-readable storage media 1718 can include volatile and nonvolatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1720 can store an operating system 1722 utilized to control the operation of the computing device 1700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 1720 can store other system or application programs and data utilized by the computing device 1700.

In one embodiment, the mass storage device 1720 or other computer-readable storage media 1718 is encoded with computer-executable instructions which, when loaded into the computing device 1700, transform the computer from a general-purpose computing system into a special-purpose computer capable of implementing the embodiments described herein. These computer-executable instructions transform the computing device 1700 by specifying how the CPUs 1704 transition between states, as described above. According to one embodiment, the computing device 1700 has access to computer-readable storage media storing computer-executable instructions which, when executed by the computing device 1700, perform the various processes described above with regard to FIGS. 1-16. The computing device 1700 can also include computer-readable storage media having instructions stored thereupon for performing any of the other computer-implemented operations described herein.

The computing device 1700 can also include one or more input/output controllers 1716 for receiving and processing input from a number of input devices, such as a keyboard, a mouse, a touchpad, a touch screen, an electronic stylus, or other type of input device. Similarly, an input/output controller 1716 can provide output to a display, such as a computer monitor, a flat-panel display, a digital projector, a printer, or other type of output device. It will be appreciated that the computing device 1700 might not include all of the components shown in FIG. 17, can include other components that are not explicitly shown in FIG. 17, or might utilize an architecture completely different than that shown in FIG. 17.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionality, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1504 (which might be referred to herein singularly as "a data center 1504" or in the plural as "the data centers 1504"). The data centers 1504 are facilities utilized to house and operate computer systems and associated components. The data centers 1504 typically include redundant and backup power, communications, cooling, and security systems. The data centers 1504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:
   one or more processors; and
   one or more non-transitory computer-readable media storing instructions executable by the one or more processors, wherein the instructions, when executed, cause the one or more processors to perform operations comprising:
   receiving first data indicating a first event service as a source for sending event data associated with an event, the event representing a change in a resource state;
   receiving second data indicating a second event service as a target for receiving the event data associated with the event;
   receiving third data indicating a queue for storing the event data;
   configuring a pipe between the first event service and the second event service based on the first data, the second data, and the third data, the pipe representing a virtual communication channel for sending the event data associated with the event, the pipe disposed the first event service and the second event service independent of receiving computer-readable instructions from a developer implementing the first event service;
   determining an occurrence of the event at the first event service;
   determining, based on determining the occurrence of the event, that the first event service is unable to send the event data to the second event service; and
   storing, based on determining that the first event service is unable to send the event data, the event data in the queue for sending to the second event service at a later time.

2. The system of claim 1, wherein the determining that the first event service is unable to send the event data to the second event service at a first time, the operations further comprising:
   determining, at a second time that is after the first time, that the first event service is able to send the event data to the second event service; and
   sending, at or after the second time and based on determining that the first event service is able to send the event data, the event data from the queue to the second event service using the pipe.

3. The system of claim 1, wherein determining, that the first event service is unable to send the event data to the second event service comprises at least one of:
   determining that a first queue associated with the first event service is full or rejected the event data;
   determining that a second queue associated with the second event service is full or rejected the event data; or
   determining that the first event service is not associated with the queue.

4. The system of claim 1, the operations further comprising:
   determining that a time period for sending the event data expired,
   wherein storing the event data in the queue is further based on determining that the time period for sending the event data expired.

5. The system of claim 1, wherein the event is a push event associated with a serverless computing environment, and the operations further comprising:
   receiving a first input from a control of a user interface to pause sending the event data from the first event service to the second event service;
   sending, based on the first input, the event data from the first event service to the queue;
   receiving a second input from the control of the user interface to resume sending the event data; and
   sending, based on the second input, the event data from the queue to the second event service.

6. A computer-implemented method comprising:
receiving first data indicating a first event service as a source for sending event data associated with an event, the event representing a change in a resource state;
receiving second data indicating a second event service as a target for receiving the event data associated with the event;
receiving third data indicating a buffer for storing the event data;
configuring a pipe between the first event service and the second event service based at least in part on the first data, the second data, and the third data, the pipe representing a virtual communication channel for sending the event data associated with the event;
associating the pipe and the buffer; and
storing the event data in the buffer for sending to the second event service.

7. The computer-implemented method of claim 6, wherein associating the pipe and the buffer comprises:
configuring the buffer between the first event service and the second event service;
generating a communication channel between the buffer and the first event service for exchanging the event data; and
sending the event data from the first event service to the buffer using the communication channel,
wherein storing the event data in the buffer is further based at least in part on the sending.

8. The computer-implemented method of claim 7, wherein the communication channel is a first a communication channel, and further comprising:
generating a second communication channel between the buffer and the second event service for exchanging the event data; and
sending the event data from the buffer to the second event service using the second communication channel.

9. The computer-implemented method of claim 6, further comprising:
determining that the first event service is unable to send the event data to the second event service; and
storing, based at least in part on determining that the first event service is unable to send the event data, the event data in the buffer for sending to the second event service at a later time.

10. The computer-implemented method of claim 9, wherein determining that the first event service is unable to send the event data to the second event service comprises at least one of:
determining that a first queue associated with the first event service is full or rejected the event data;
determining that a second queue associated with the second event service is full or rejected the event data; or
determining that the first event service is not associated with the queue.

11. The computer-implemented method of claim 6, further comprising:
determining that the first event service is able to send the event data to the second event service; and
sending, based on determining that the first event service is able to send the event data, the event data from the buffer to the second event service using the pipe.

12. The computer-implemented method of claim 6, further comprising:
determining that a time period for sending the event data expired,
wherein storing the event data in the buffer is further based at least in part on determining that the time period for sending the event data expired.

13. The computer-implemented method of claim 6, wherein the event is a push event associated with a serverless computing environment, and further comprising:
receiving a first input from a control of a user interface to pause sending the event data from the first event service to the second event service;
sending, based at least in part on the first input, the event data from the first event service to the buffer;
receiving a second input from the control of the user interface to resume sending the event data; and
sending, based at least in part on the second input, the event data from the buffer to the second event service.

14. The computer-implemented method of claim 13, wherein:
the first input is received at a first time,
the second input is received at a second time that is after the first time, and
the second input further indicates to resume sending the event data associated with the first time or to resume sending the event data associated with the second time.

15. The computer-implemented method of claim 13, wherein the buffer is a dead letter queue, and further comprising:
maintaining a copy of the event data in the dead letter queue for a time period after sending the event data from the dead letter queue to the second event service.

16. One or more non-transitory computer-readable media storing instructions that, when executed, cause one or more processors to perform operations comprising:
receiving first data indicating a first event service as a source for sending event data associated with an event, the event representing a change in a resource state;
receiving second data indicating a second event service as a target for receiving the event data associated with the event;
receiving third data indicating a buffer for storing the event data;
configuring a pipe between the first event service and the second event service based at least in part on the first data, the second data, and the third data, the pipe representing a virtual communication channel for sending the event data associated with the event;
associating the pipe and the buffer; and
storing the event data in the buffer for sending to the second event service.

17. The one or more non-transitory computer-readable media of claim 16, wherein associating the pipe and the buffer comprises:
configuring the buffer between the first event service and the second event service;
generating a communication channel between the buffer and the first event service for exchanging the event data; and
sending the event data from the first event service to the buffer using the communication channel,
wherein storing the event data in the buffer is further based at least in part on the sending.

18. The one or more non-transitory computer-readable media of claim 17, wherein the communication channel is a first a communication channel, and further comprising:
generating a second communication channel between the buffer and the second event service for exchanging the event data; and sending the event data from the buffer to the second event service using the second communication channel.

19. The one or more non-transitory computer-readable media of claim 16, the operations further comprising:
   determining that the first event service is unable to send the event data to the second event service; and
   storing, based at least in part on determining that the first event service is unable to send the event data, the event data in the buffer for sending to the second event service at a later time.

20. The one or more non-transitory computer-readable media of claim 16, the operations further comprising:
   receiving a first input from a control of a user interface to pause sending the event data from the first event service to the second event service;
   sending, based at least in part on the first input, the event data from the first event service to the buffer;
   receiving a second input from the control of the user interface to resume sending the event data; and
   sending, based at least in part on the second input, the event data from the buffer to the second event service.

* * * * *